United States Patent [19]
Yamashita et al.

[11] Patent Number: 5,225,948
[45] Date of Patent: Jul. 6, 1993

[54] AUTOMATIC CASSETTE LOADER/UNLOADER

[75] Inventors: Kouhei Yamashita; Akira Takagi, both of Yokohama, Japan

[73] Assignee: Victor Company of Japan, Ltd., Yokohama, Japan

[21] Appl. No.: 676,154

[22] Filed: Mar. 27, 1991

[30] Foreign Application Priority Data

Mar. 29, 1990 [JP] Japan .................................. 2-82101

[51] Int. Cl.⁵ ...................... G11B 15/68; G11B 5/008
[52] U.S. Cl. ........................................ 360/92; 360/96.5
[58] Field of Search ................ 360/92, 91, 96.5, 96.6

[56] References Cited

U.S. PATENT DOCUMENTS

| | | | |
|---|---|---|---|
| 3,758,122 | 9/1973 | Kawaharasaki | 360/92 |
| 3,852,819 | 12/1974 | Staar | 360/92 |
| 4,233,638 | 11/1980 | Bulick, Jr. et al. | 360/92 |
| 4,381,527 | 4/1983 | Titus, IV et al. | 360/92 |
| 4,420,779 | 12/1983 | Takano et al. | 360/92 |
| 4,954,915 | 9/1990 | Koda et al. | 360/92 |
| 5,089,920 | 2/1992 | Bryer et al. | 360/92 |
| 5,144,506 | 9/1992 | Sahota | 360/92 |

FOREIGN PATENT DOCUMENTS 58-153264 9/1983 Japan .
63-276746 11/1988 Japan .

Primary Examiner—Stuart S. Levy
Assistant Examiner—Jefferson Evans
Attorney, Agent, or Firm—Lowe, Price LeBlanc & Becker

[57] ABSTRACT

An automatic cassette loader/unloader loads and unloads a magnetic tape cassette into and from a magnetic recorder/reproducer such as a video tape recorder. The automatic cassette loader/unloader includes a cassette holder for holding a magnetic tape cassette therein. The cassette holder, with the magnetic tape cassette held therein, is movable into and out of the magnetic recorder/reproducer. A cassette discharge mechanism removes the tape cassette from the cassette holder which has been moved out of the magnetic recorder/reproducer. A cassette supply mechanism places a tape cassette into the cassette holder which is empty and has been moved out of the magnetic recorder/reproducer.

15 Claims, 22 Drawing Sheets

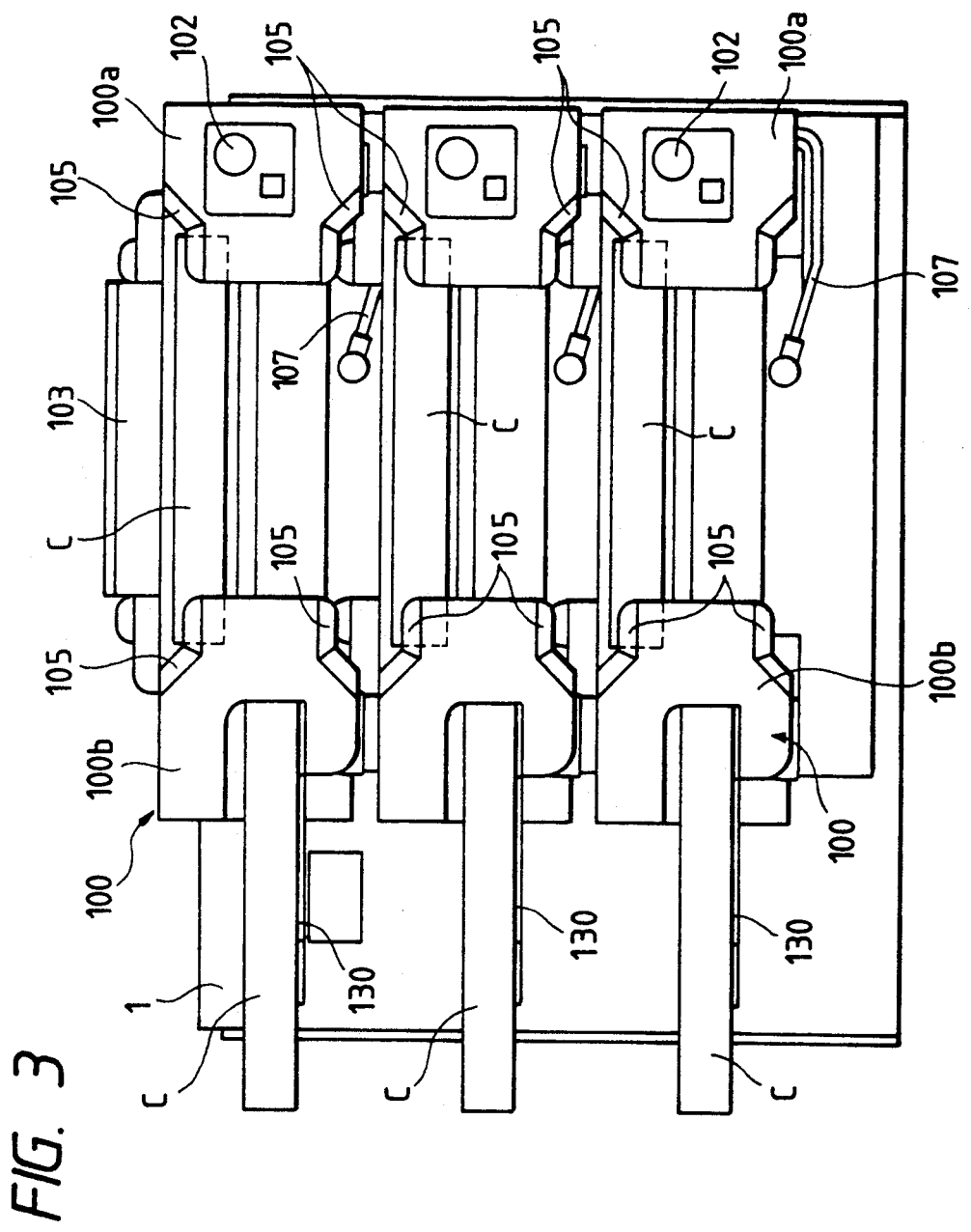

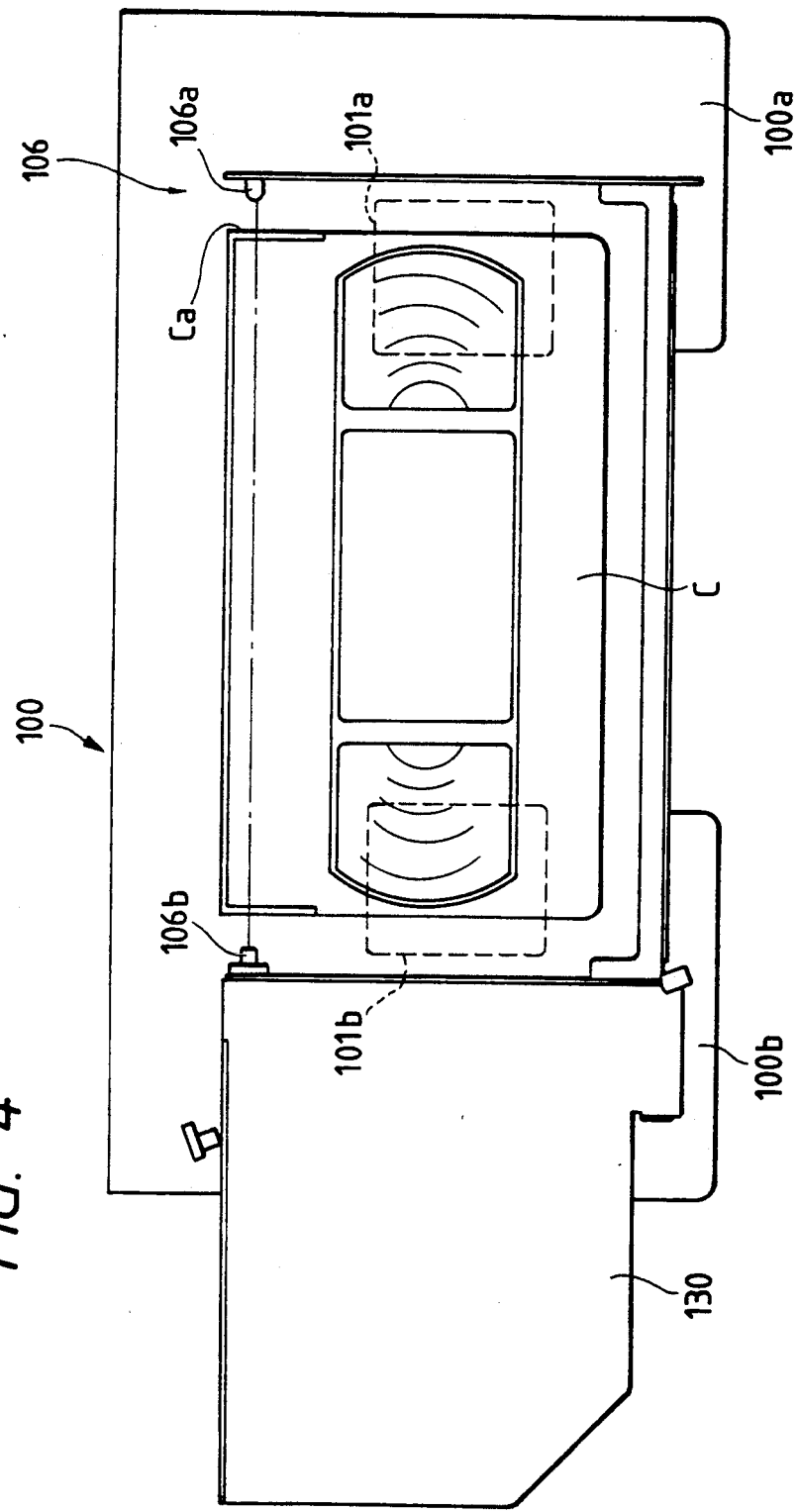

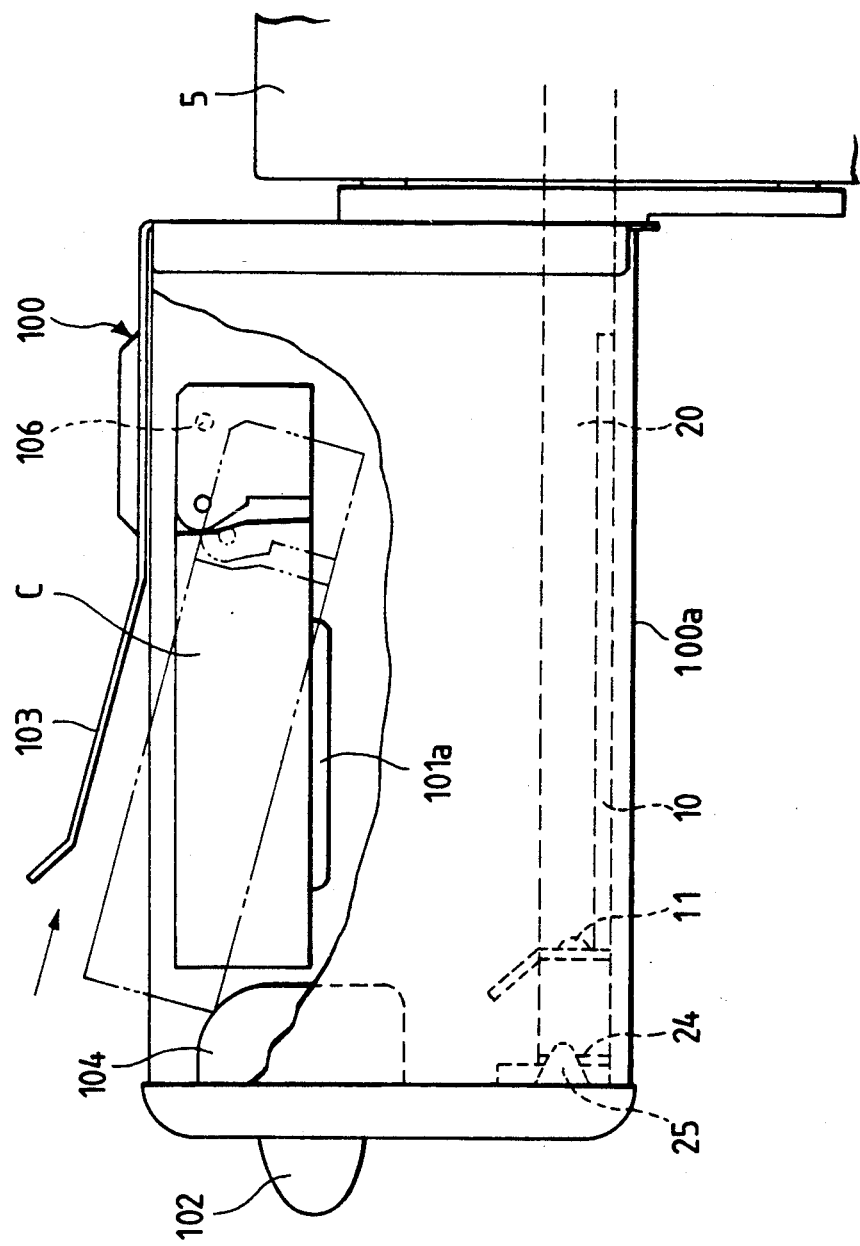

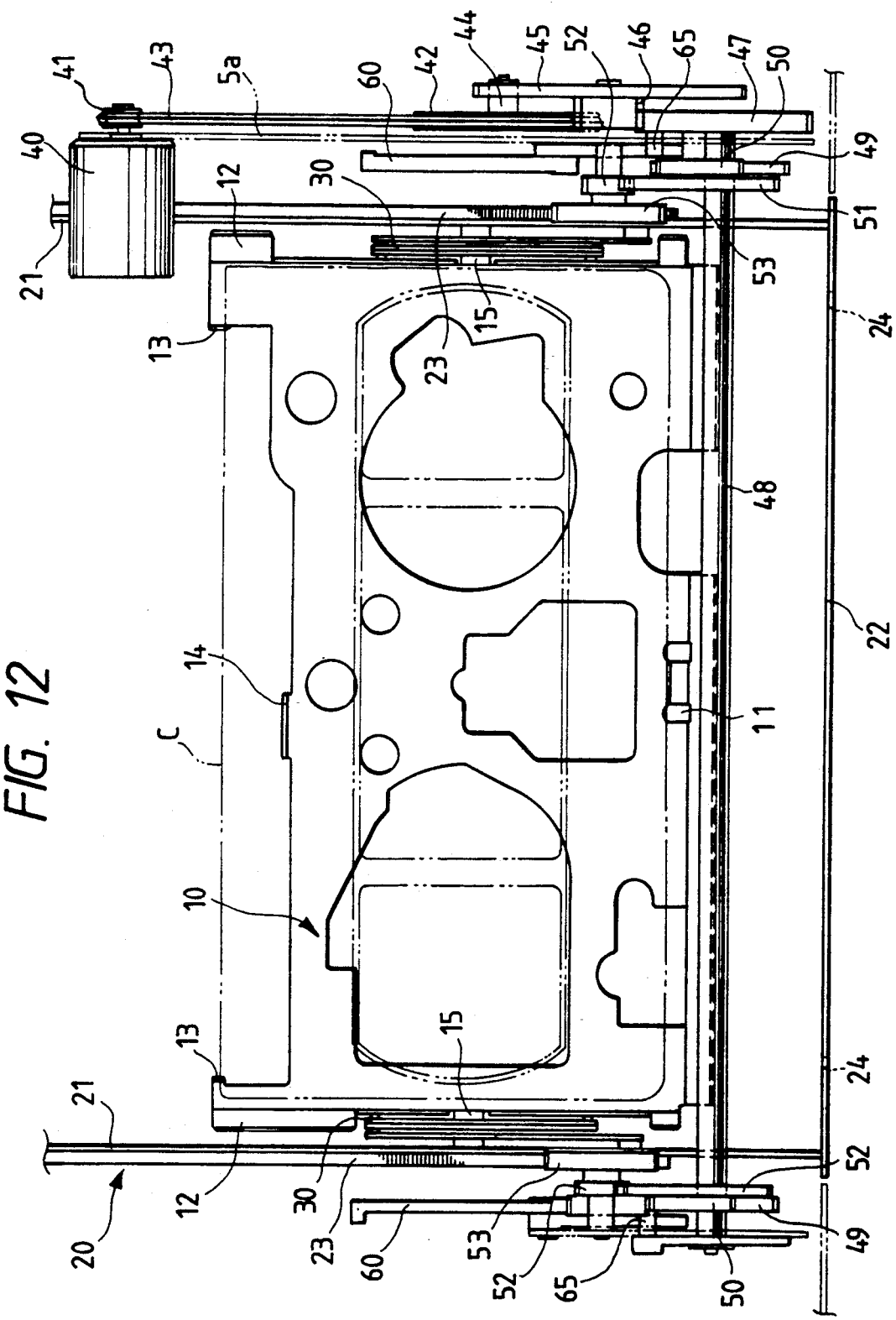

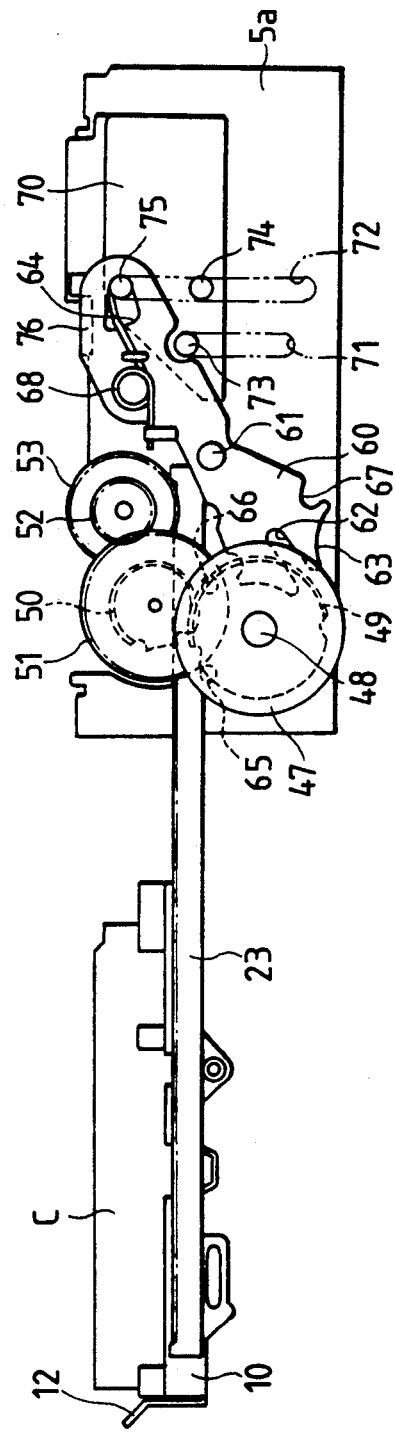
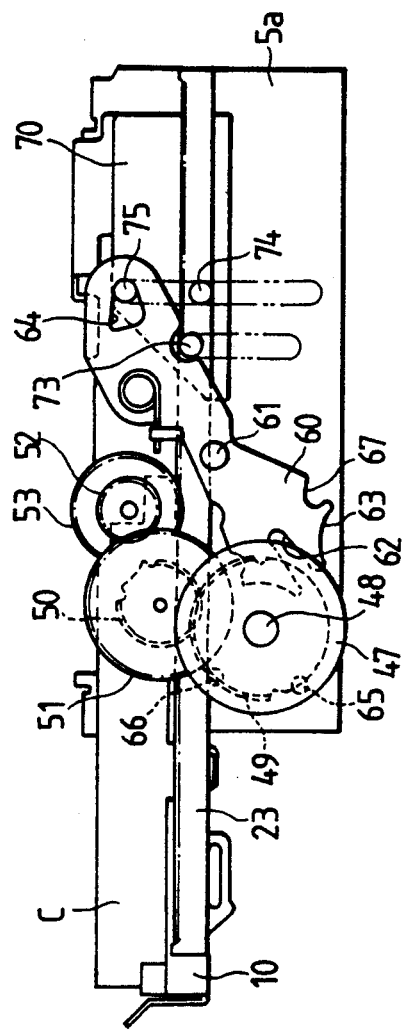
FIG. 13A
FIG. 13B

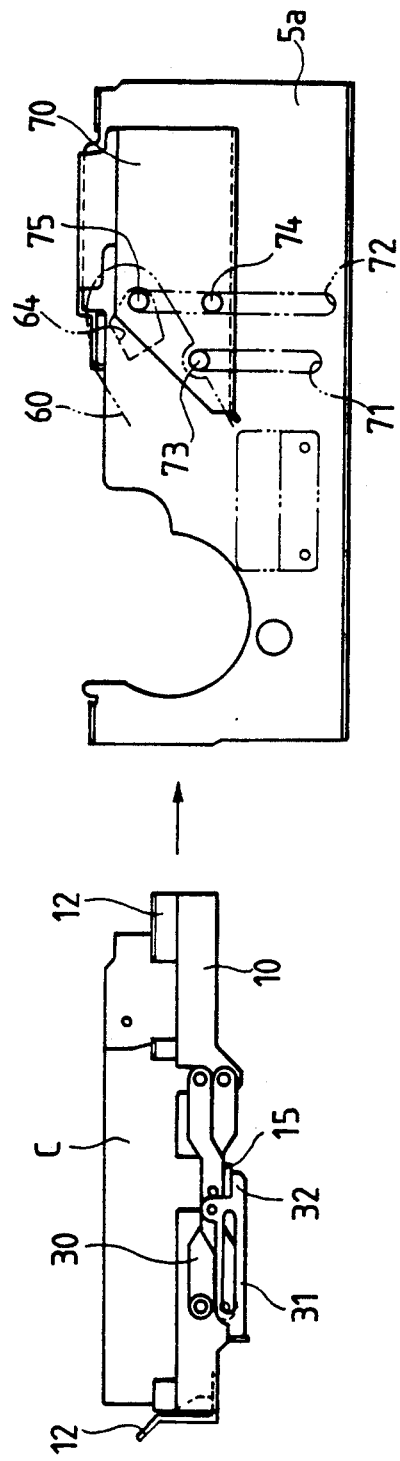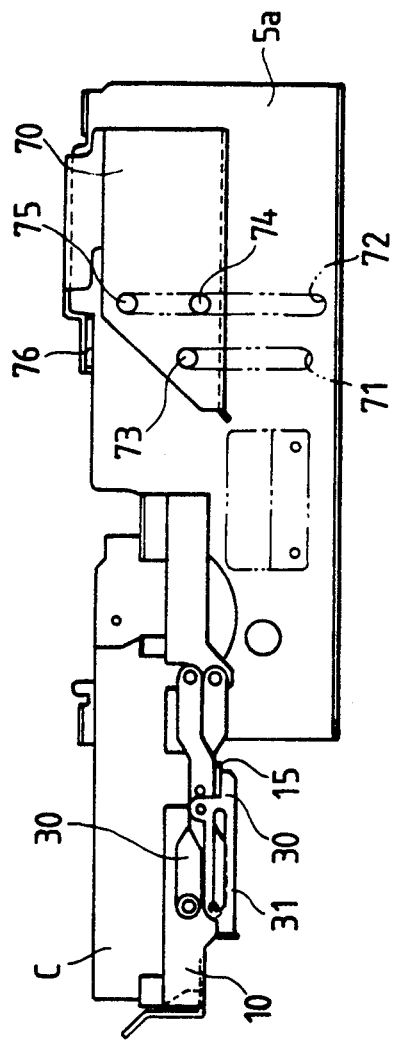
FIG. 14A
FIG. 14B

2

AUTOMATIC CASSETTE LOADER/UNLOADER

FIELD OF THE INVENTION

The present invention relates to an automatic cassette loader/unloader for automatically loading and unloading tape cassettes which house magnetic tapes, into and from magnetic recorder/reproducers such as video tape recorders or audio tape recorders.

DESCRIPTION OF RELATED ART

Japanese Laid-Open Patent Publication No. 58(1983)-153264 discloses an apparatus for automatically inserting and discharging a magnetic tape cassette into and from a magnetic recorder/reproducer such as a video tape recorder (VTR), a digital audio tape recorder (DAT), or the like.

The disclosed apparatus comprises an automatic cassette loader/unloader mounted on the front panel of a VTR deck unit, for example. The automatic cassette loader/unloader automatically inserts a magnetic tape cassette into a cassette holder in the VTR deck unit and discharges another magnetic tape cassette from the cassette holder.

The automatic cassette loader/unloader has a cassette insertion/discharge passage which is defined therein by a floor surface thereof. A magnetic tape cassette is loaded into and removed from the cassette holder through the cassette insertion/discharge passage by feed rollers while slidingly moving on the floor surface.

If the floor surface, which defines the cassette insertion/discharge passage, of the automatic cassette loader/unloader is vertically displaced somewhat with respect to the bottom surface of the cassette holder, then a magnetic tape cassette cannot be inserted smoothly from the cassette insertion/discharge passage into the cassette holder. In addition, a magnetic tape cassette as it is inserted or discharged is likely to become tilted since the attitude of the magnetic tape cassette is not fully restricted in the cassette insertion/discharge passage. Another problem is that the automatic cassette loader/unloader requires a mechanism to push a magnetic tape cassette fully into the cassette holder because a cassette housing in the VTR deck unit does not operate unless the magnetic tape cassette is completely pushed into the cassette holder. With such a pushing mechanism incorporated, the automatic cassette loader/unloader is relatively large in size, making it difficult to stack a plurality of such automatic cassette loader/unloaders for space saving purposes.

SUMMARY OF THE INVENTION

It is an object of the present invention to provide an automatic cassette loader/unloader for smoothly loading and unloading magnetic tape cassette into and out of a magnetic recorder/reproducer.

Another object of the present invention is to provide an automatic cassette loader/unloader which is relatively simple in structure and hence small in size, so that a plurality of such automatic cassette loader/unloaders can be stacked for space saving purposes.

According to the present invention, there is provided a cassette loader/unloader for loading a tape cassette into and unloading a tape cassette from a magnetic recorder/reproducer, comprises a cassette holder for holding a tape cassette therein, means for moving the cassette holder, with the tape cassette held therein, into and out of the magnetic recorder/reproducer, a cassette discharge mechanism for removing the tape cassette from the cassette holder which has been moved out of the magnetic recorder/reproducer, and a cassette supply mechanism for placing a tape cassette into the cassette holder which is empty and has been moved out of the magnetic recorder/reproducer.

The cassette holder is removably supported on a tray, which is movable, with the cassette holder supported thereon, into and out of the magnetic recorder/reproducer. The cassette holder has at least one guide, and the cassette supply mechanism allows one side of the tape cassette to drop into the cassette holder while said one side is being guided by the guide in contact therewith, and subsequently allows an opposite side of the tape cassette to drop into the cassette holder.

The cassette discharge mechanism comprises a lifter arm for lifting one of opposite sides of the tape cassette off the cassette holder, and a pusher for pushing the tape cassette laterally out of the cassette holder parallel to the magnetic recorder/reproducer, with the lifted side of the tape cassette being positioned ahead as a leading side.

The cassette holder has first engaging means, and the cassette loader/unloader further includes second engaging means for engaging the first engaging means to position the cassette holder when the cassette holder is moved out of the magnetic recorder/reproducer.

The cassette loader/unloader further includes a pair of spaced arms having front faces with recesses defined in edges thereof for guiding a tape cassette therethrough when the tape cassette is inserted into the cassette loader/unloader, and a guide plate for guiding the tape cassette when the tape cassette is inserted through the recesses.

The cassette discharge mechanism discharges the tape cassette laterally from the cassette holder parallel to the magnetic recorder/reproducer, and includes a cassette turning mechanism for horizontally turning the tape cassette which is discharged from the cassette The cassette supply mechanism comprises a pair of spaced, angularly movable flaps for supporting respective sides of the tape cassette, and the cassette loader/unloader further includes a pair of spaced arms, and a sensor disposed in the arms for detecting a corner of the tape cassette which is supported on the flaps.

The cassette discharge mechanism comprises a laterally extending discharge tray for receiving the tape cassette removed from the cassette holder, the discharge tray having a bank for preventing the removed tape cassette from returning into the cassette holder.

With the arrangement of the present invention, since the tape cassette is transferred between the cassette loader/unloader and the magnetic recorder/reproducer by the common cassette holder, the tape cassette can smoothly be loaded and unloaded without being caught while it is being transferred.

The tray with the cassette holder supported thereon is actuated by a mechanism which is disposed in the magnetic recorder/reproducer. Therefore, the structure in the cassette loader/unloader is relatively simple, making the cassette loader/unloader relatively small in size. As a result, a plurality of such cassette loader/unloaders can be stacked for space saving purposes.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a front elevational view of the VTR system shown in FIG. 1;

FIG. 4 is a plan view of a cassette detecting mechanism of each of the automatic cassette loader/unloaders;

FIG. 8 is a side elevational view of the automatic cassette loader/unloader;

FIG. 12 is a plan view of the front portion of the magnetic recorder/reproducer;

FIGS. 13A through 13D are side elevational views showing a progressive process of operation of a geneva arm for lowering the cassette holder;

FIGS. 14A through 14D are side elevational views showing a progressive process of moving the cassette holder;

DETAILED DESCRIPTION

Figure 1:
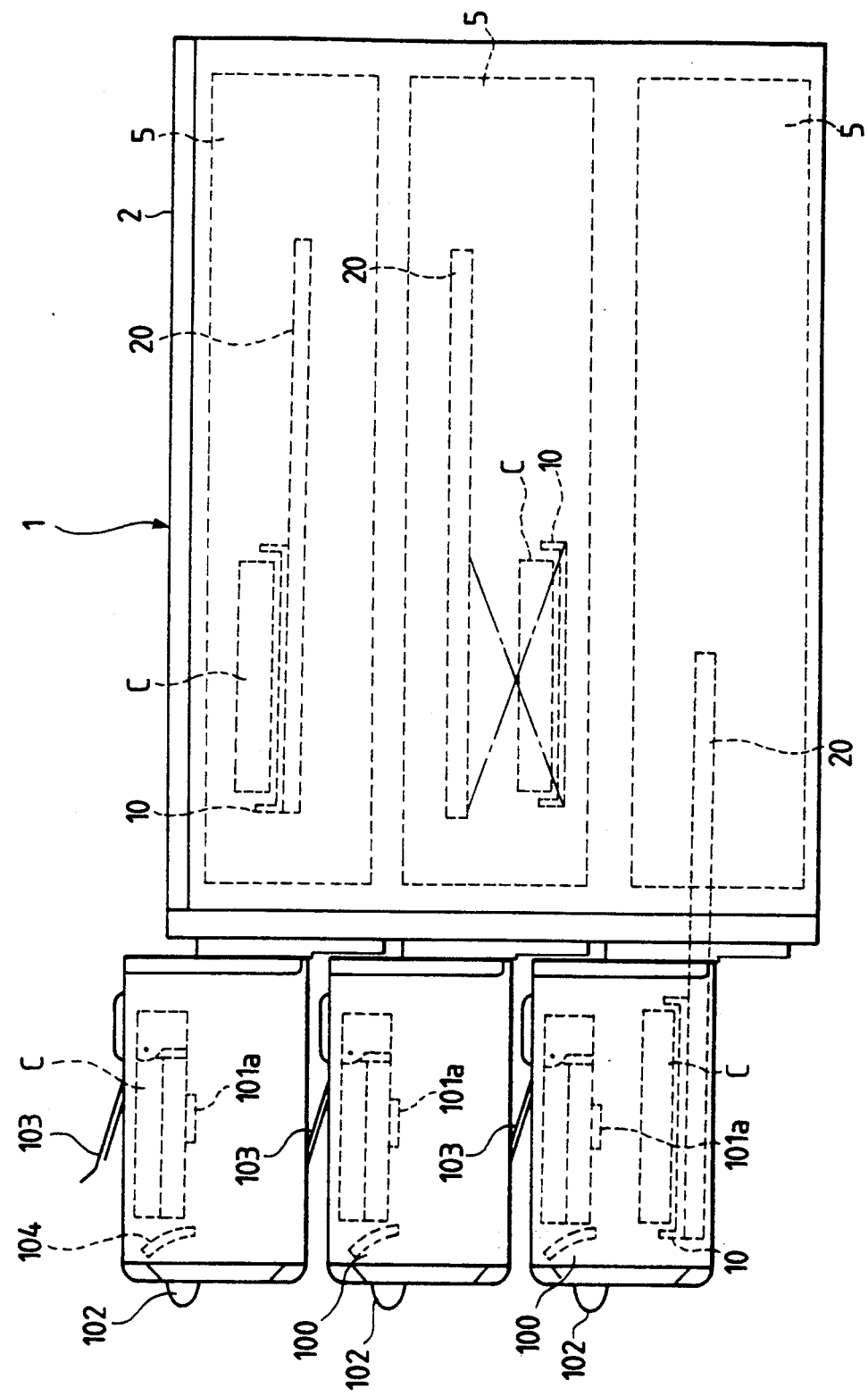
FIG. 1 is a side elevational view of a VTR system which comprises magnetic recorder/reproducers associated with automatic cassette loader/unloaders according to the present invention.
Figure 2:
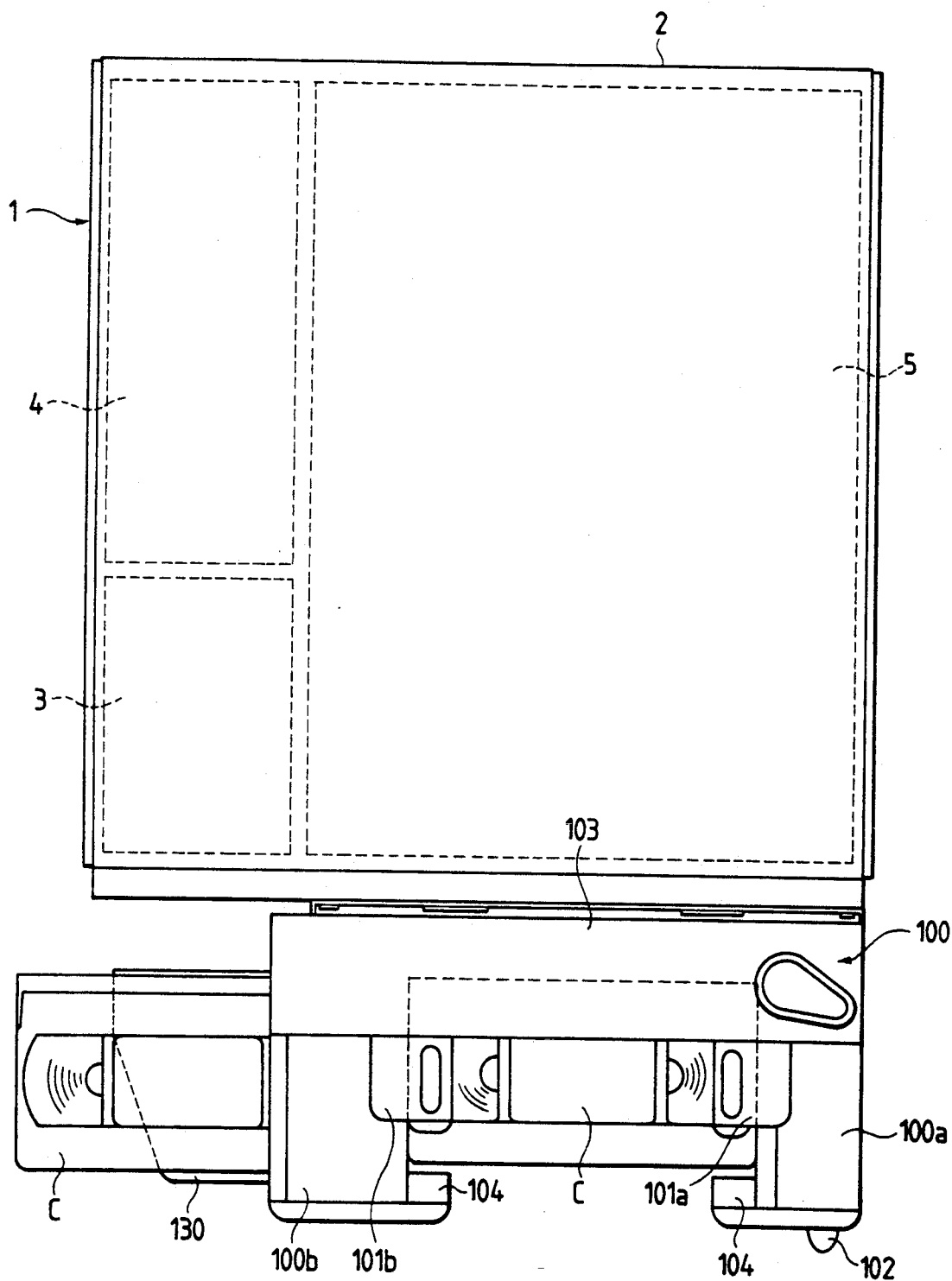
FIG. 2 is a plan view of the VTR system shown in FIG. 1.

FIGS. 1 through 3 show a video tape recorder (VTR) system 1 composed of a stack of magnetic recorder/reproducers or VTR deck units 5 which are associated respectively with automatic cassette loader/unloaders (changers) 100 according to the present invention. Each of the automatic cassette loader/unloaders 100 is detachably mounted on a front panel of one of the VTR deck units 5.

As shown in FIG. 2, the VTR system 1 has a signal processor 3 with selectively replaceable processor boards for processing video and audio signals to be recorded and reproduced, and a controller 4 for controlling the VTR deck units 5. The signal processor 3 and the controller 3 is disposed in one side of a box-shaped cabinet 2, and three vertically stacked VTR deck units 5 are disposed laterally of the signal processor 3 and the controller 4 in the cabinet 2. Therefore, three vertically stacked automatic cassette loader/unloaders 100 are detachably mounted on the respective front panels of the VTR deck units 5.

Since the automatic cassette loader/unloaders 100 are identical in structure to each other, only one of the automatic cassette loader/unloaders 100 will be described in detail below. The automatic cassette loader/unloader 100 has a pair of spaced right and left arms 100a, 100b projecting away from the corresponding VTR deck unit 5, as shown in FIG. 2. The right arm 100a has on its front face a lamp 102 which, when turned on, indicates that the VTR deck unit 5 is in operation. A discharge tray 130 is attached to an outer side of the left arm 100b and extends outwardly in a direction remote from the right arm 100a. A guide plate 103 which extends obliquely upwardly away from the VTR deck unit 5 is attached to and positioned between the right and left arms 100a, 100b. Guides 104 are attached to the back sides of the front faces of the right and left arms 100a, 100b and positioned on the inner sides of the right and left arms 100a, 100b (see also FIG. 8). The front faces of the right and left arms 100a, 100b have recesses 105 defined in inner upper and lower edges thereof. The confronting recesses 105 of the lowermost and middle automatic cassette changers 100, and the confronting recesses 105 of the middle and uppermost automatic cassette loader/unloaders 100 jointly serve to guide sides of magnetic tape cassettes C when they are to be inserted into the lowermost and middle automatic cassette loader/unloaders 100. The upwardly opening recesses 105 of the uppermost automatic cassette loader/unloaders 100 also serve to guide sides of a magnetic tape cassette C when it is to be inserted into the uppermost automatic cassette loader/unloader 100.

When a magnetic tape cassette C is inserted through the recesses 105, the inserted magnetic tape cassette C is guided by the guide plate 103 and the guides 104 onto a pair of spaced flaps 101a, 101b. When the magnetic tape cassette C is placed in a given position on the flaps 101a, 101b, it is detected by a cassette detecting mechanism.

As shown in FIG. 4, the cassette detecting mechanism comprises a transmissive sensor 106 composed of a light-emitting element 106a and a light-detecting element 106b which are aligned with each other. The light-emitting element 106a is supported on the right arm 100a and the light-detecting element 106b is supported on the left arm 100b such that a light beam emitted from the light-emitting element 106a toward the light-detecting element 106b is interrupted by an upper corner of a lid Ca of the magnetic tape cassette C. Of course, the light-emitting element 106a may be supported on the left arm 100b and the light-detecting element 106b may be supported on the right arm 100a.

When the magnetic tape cassette C is placed properly on the flaps 101a, 101b, the light beam from the light-emitting element 106a is interrupted by the upper corner of the lid Ca of the magnetic tape cassette C. The sensor 106 now detects the magnetic tape cassette C as it is properly inserted and positioned, after which the magnetic tape cassette C may drop from the flaps 101a, 101b, as described later.

The automatic cassette loader/unloaders 100 are electrically connected to the controller 4 of the VTR system 1 through cables 107 (FIG. 3).

Operation of the VTR system 1 will briefly be described below with reference to FIGS. 5A through 5E, 6A through 6E, and 7A through 7F. FIGS. 5A through 5E show a process of progressively placing a magnetic tape cassette into a cassette holder. FIGS. 6A through 6E show a process of progressively moving a magnetic tape cassette into a recording/reproducing position in a VTR deck unit. FIGS. 7A through 7F show a process of progressively moving a magnetic tape cassette, which has returned to an automatic cassette loader/unloader, onto a discharge tray.

Figure 5A:
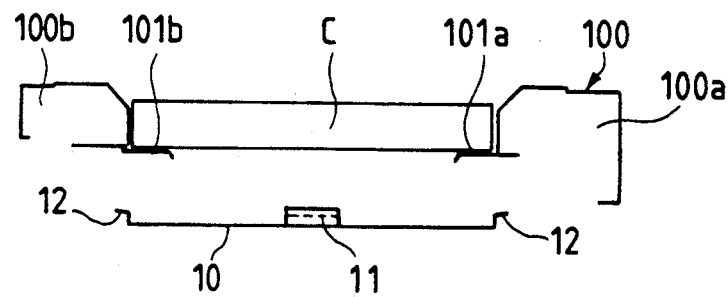
FIGS. 5A through 5E are schematic views showing a progressive process of placing a magnetic tape cassette into a cassette holder.
Figure 5B:
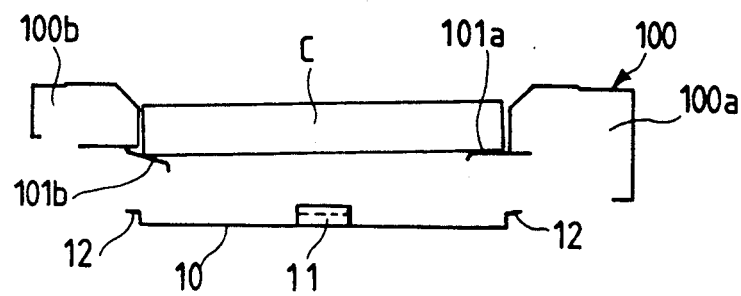
Figure 5C:
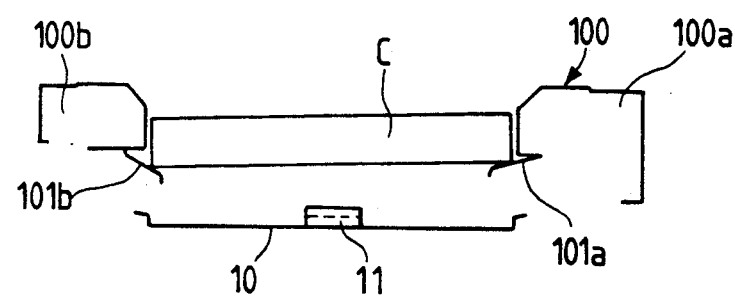
Figure 5D:
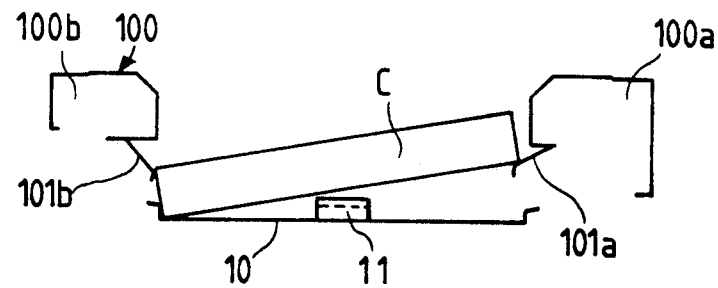
Figure 5E:
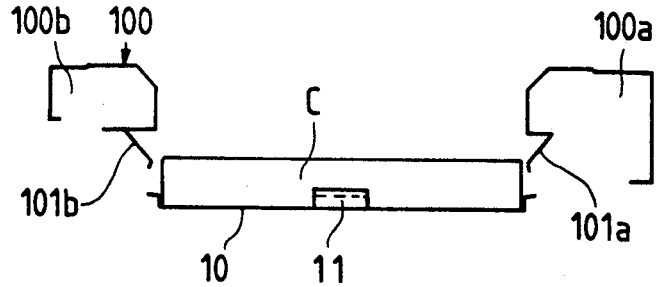
Figure 6A:
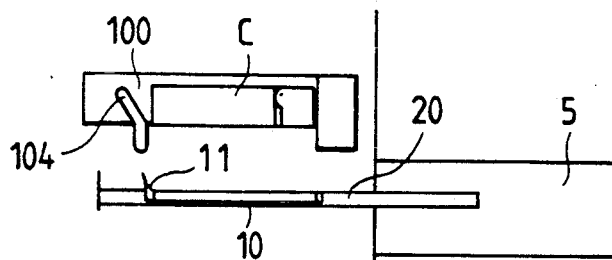
FIGS. 6A through 6E are schematic views showing a progressive process of moving a magnetic tape cassette into a recording/reproducing position in a magnetic recorder/reproducer.
Figure 6B:
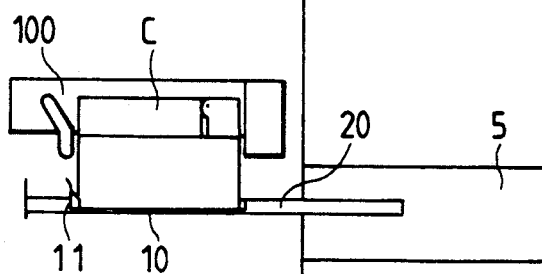
Figure 6C:
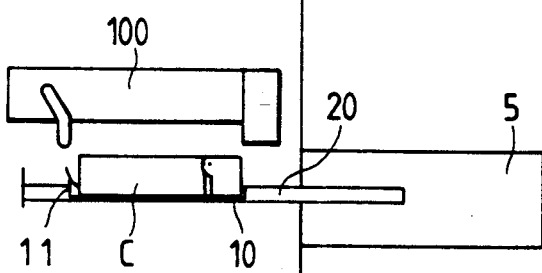

As shown in FIGS. 5A and 6A, a magnetic tape cassette C is set on the flaps 101a, 101b of the automatic cassette loader/unloader 100. At this time, the flaps 101a, 101b are in a closed position and the magnetic tape cassette C is in a standby condition. From the standby condition, one of the flaps 101b starts to be angularly moved downwardly as shown in FIG. 5B, and thereafter the other flap 101a starts to be angularly moved downwardly with a time lag as shown in FIG. 5C. As a result, one side of the magnetic tape cassette C drops into a cassette holder 10 in the automatic cassette loader/unloader 100 earlier than the other side of the magnetic tape cassette C, and finally the other side thereof drops into the cassette holder 10, as shown in FIGS. 5D, 5E and 6B, 6C. At this time, the sides of the magnetic tape cassette C abut against respective outwardly spreading guides 12 of the cassette holder 10. Since the sides of the magnetic tape cassette C successively fall into abutting engagement with the guides 12 of the cassette holder 10, the magnetic tape cassette C is longitudinally positioned accurately in the cassette holder 10. At the same time, the rear end (left side as shown in FIGS. 6A through 6E) of the magnetic tape cassette C abuts against a tapered projection 11 of the cassette holder 10, whereupon the magnetic tape cassette C is slightly pushed toward the VTR deck unit 5 by the tapered projection 11. Therefore, the magnetic tape cassette C is also positioned accurately in its transverse direction.

Figure 6D:
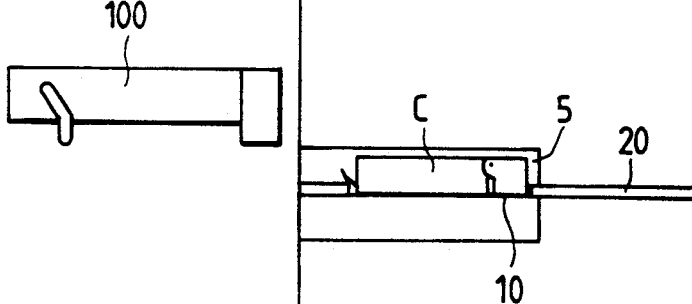
Figure 6E:
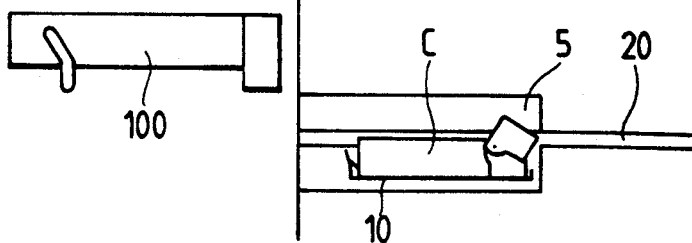

Then, as shown in FIG. 6D, the cassette holder 10 and a tray 20 which supports the cassette holder 10 are drawn together into the VTR deck unit 5. Thereafter, the cassette holder 10 with the magnetic tape cassette C held therein is lowered into a recording/reproducing position in the VTR deck unit 5, as shown in FIG. 6E, whereupon data can be recorded on or reproduced from the magnetic tape in the magnetic tape cassette C.

Figure 7A:
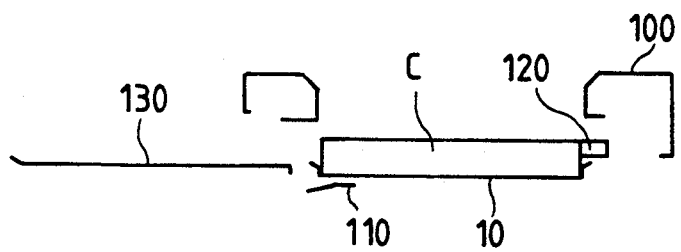
FIGS. 7A through 7F are schematic views showing a progressive process of moving a magnetic tape cassette, which has returned to an automatic cassette loader/unloader, onto a discharge tray.
Figure 7B:
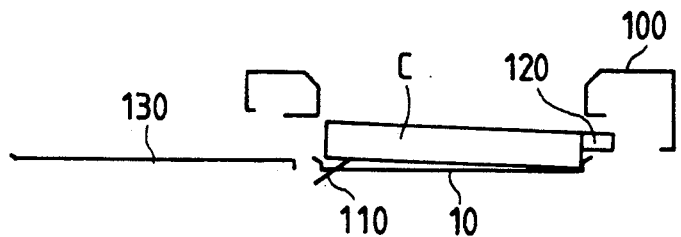
Figure 7C:
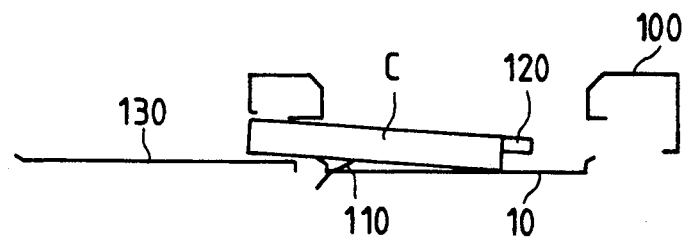
Figure 7D:
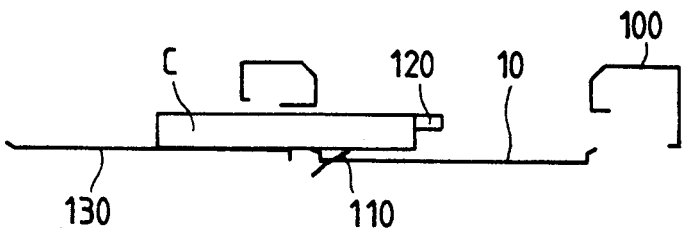
Figure 7E:
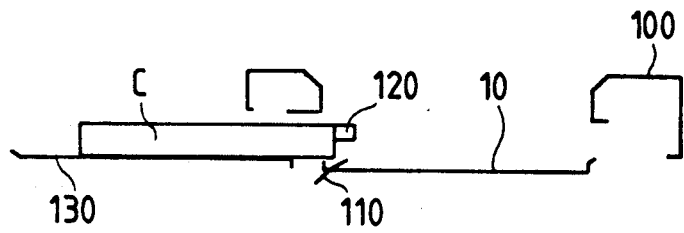
Figure 7F:
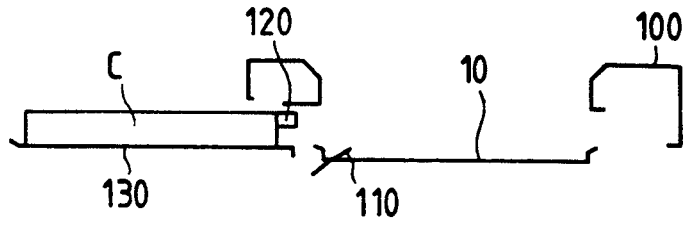

When the data recording or reproducing process is over, the cassette holder 10 with the magnetic tape cassette C held therein is moved back from the VTR deck unit 5 into the automatic cassette loader 100, as shown in FIG. 7A. Thereafter, as shown in FIG. 7B, one side of the magnetic tape cassette C is lifted off the cassette holder 10 by an arm 110, and then a pusher 120 is propelled laterally with respect to the cassette holder 10 to eject the recorded or reproduced magnetic tape cassette C onto the discharge tray 130, as shown in FIGS. 6C through 6F.

Various components of the automatic cassette loader/unloader 100 will now be described in detail with reference to FIGS. 8 through 21.

Figure 9:
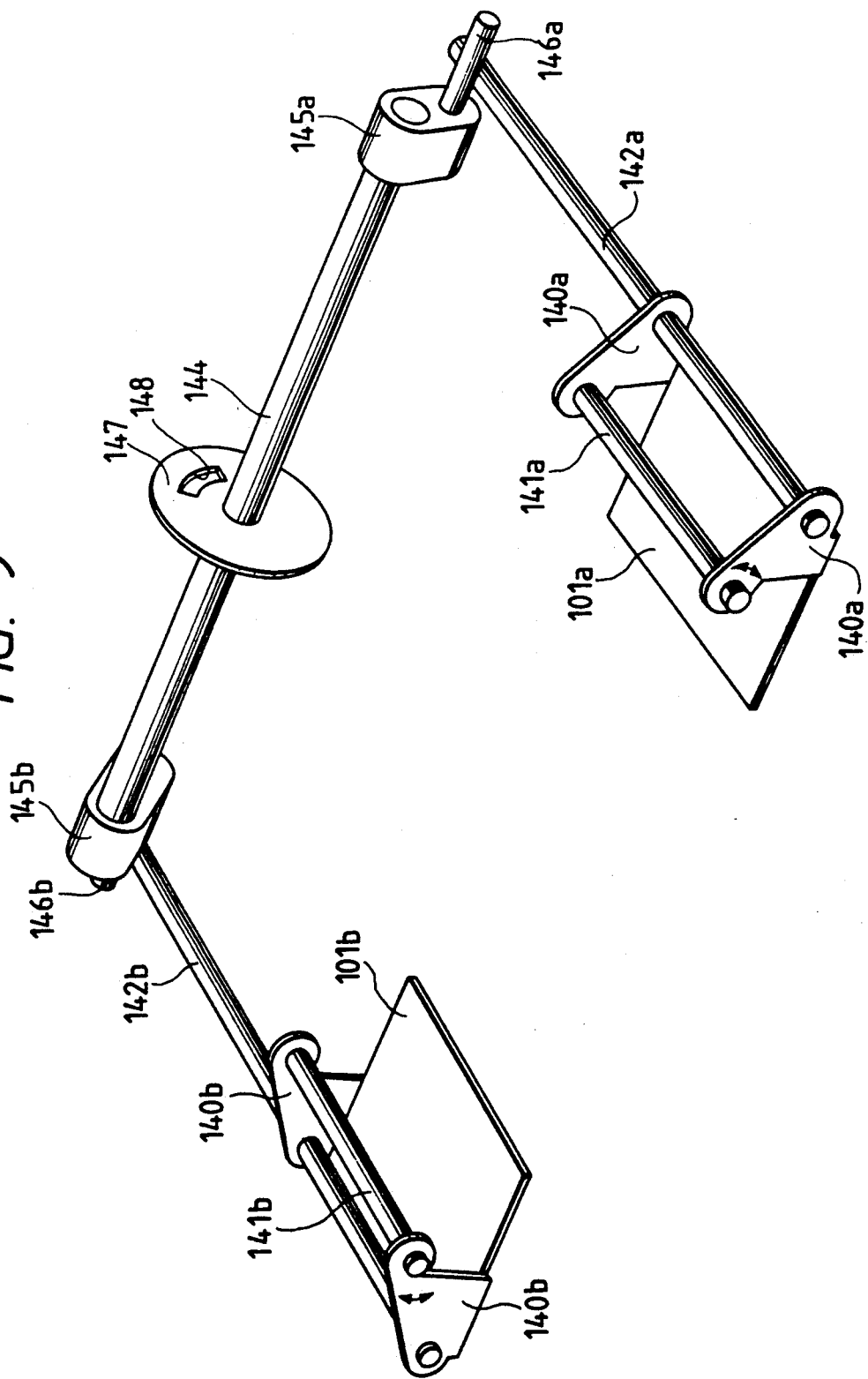
FIG. 9 is a perspective view of flaps.

A mechanical crank for actuating the flaps 101a, 101b will be described below with reference to FIG. 9. The flaps 101a, 101b are rotatably supported by brackets 140a, 140b, respectively, on respective shafts 141a, 141b which are mounted in the automatic cassette loader/unloader 100. Rods 142a, 142b are fixed to the brackets 140a, 140b, respectively, and extend backwards in the arms 100a, 100b. The arm 100a houses a motor 143 (see FIG. 16) which is operatively coupled to a shaft 144 that extends longitudinally in the automatic cassette loader/unloader 10, i.e., in and between the arms 100a, 100b, so that the shaft 144 can be rotated about its own axis by the motor 143. Crank pins 146a, 146b are eccentrically attached to the opposite ends of the shaft 144 by respective joints 145a, 145b, and held against ends of the rods 142a, 142b remote from the flaps 101a, 101b. When the shaft 144 rotates about its own axis, the flaps 101a, 101b swing vertically about the respective shafts 141a, 141b. The pins 146a, 146b are angularly positioned differently, i.e., located at different angular positions, with respect to the shaft 144 such that the flap 101b swings downwardly earlier than the flap 101a, allowing one side of the magnetic tape cassette C to drop into the cassette holder 10 faster than the other side. The side of the magnetic tape cassette C which has dropped earlier than the other side is engaged by one of the guides 12, which spread outwardly, on the side edges of the cassette holder 10. Thereafter, the other side of the magnetic tape cassette C falls into engagement with the other guide 12 of the cassette holder 10. Consequently, the magnetic tape cassette C is longitudinally positioned accurately with respect to the cassette holder 10.

Instead of the pins 146a, 146b being disposed in different angular positions, the flaps 101a, 101b may be of different widths or may be preset in different initial angular positions in order to allow one side of the magnetic tape cassette C to drop earlier than the other side into the cassette holder 10.

When the magnetic tape cassette C is placed in proper attitude on the flaps 101a, 101b, it is detected by the sensor 106, and the magnetic tape cassette C can now drop into the cassette holder 10 (see FIG. 4). Specifically, when it is confirmed by another sensor and the sensor 106 that the cassette holder 10 is empty and located in a predetermined position, the motor 143 is energized to cause the flaps 101a, 101b to swing downwardly, one after another as described above, to lower the magnetic tape cassette C into the cassette holder 10. Then, the flaps 101a, 101b swing back upwardly into a closed position (see FIGS. 5A and 9) in which they can receive another magnetic tape cassette C thereon, whereupon the flaps 101a, 101b are stopped. The stoppage of the flaps 101a, 101b is detected by a sensor 149 which detects a hole 148 (see FIGS. 9, 16, and 17) defined in a disc 147 mounted on the shaft 144. After the flaps 101a, 101b have swung downwardly and then upwardly, it is preferable to stop the flaps 101a, 101b in a slightly downwardly inclined condition because they tend to stop in that condition on account of an error of the detection of the stoppage of the flaps 101a, 101b or a time lag before the flaps 101a, 101b actually stop after their stoppage has been detected, due to dimensional or assembly errors of the various components.

The cassette holder 10 will be described below with reference to FIG. 10.

Figure 10:
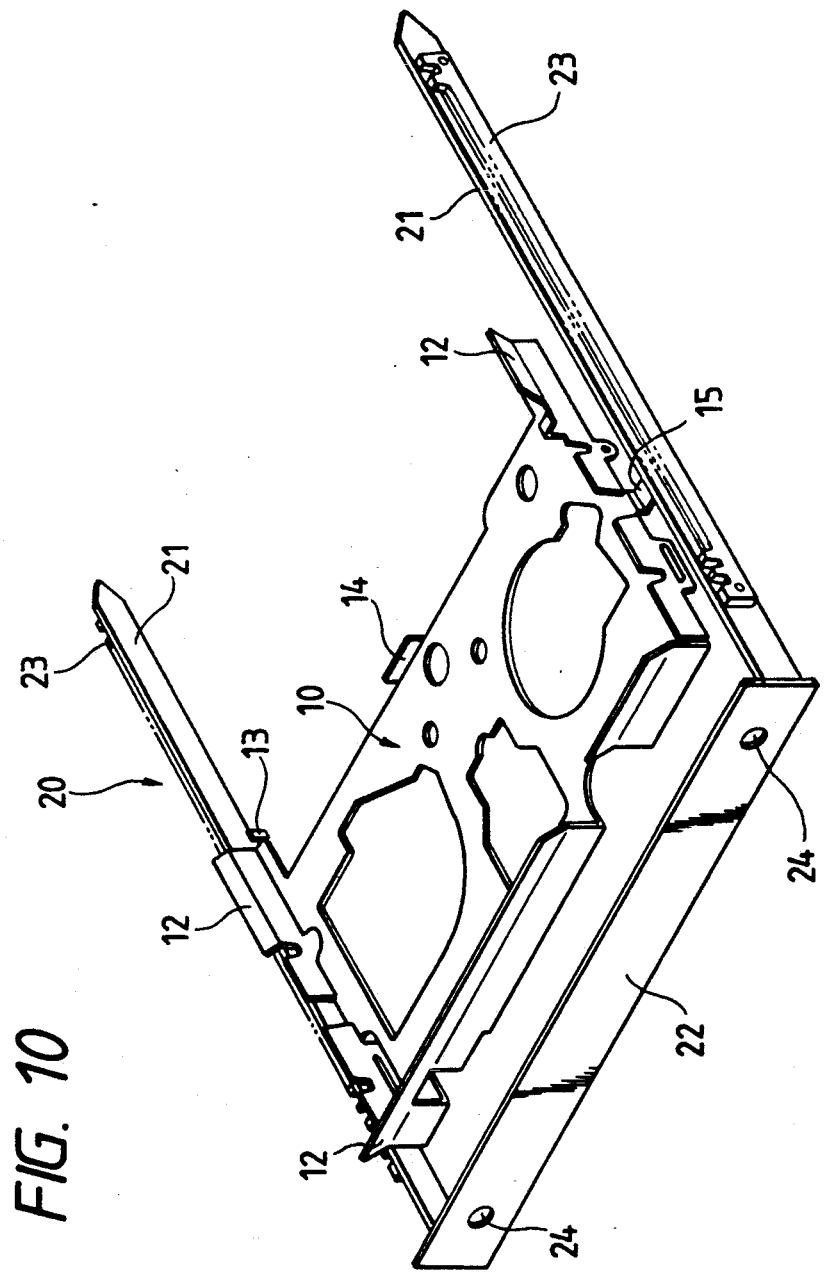
FIG. 10 is a perspective view of a tray and a cassette holder.

As shown in FIG. 10, the cassette holder 10 is part of a tray 20 which is in the form of a frame comprising a pair of laterally spaced side plates 21 extending transversely with respect to the automatic cassette loader/unloader, and a front plate 22 extending between and joined to the front ends of side plates 21. The side plates 21 are associated with respective racks 23 extending along and fixed to outer surfaces of the side plates 21. The front plate 22 has a pair of spaced positioning holes 24 defined in opposite end portions thereof near the front ends of the side plates 21. When the tray 20 is forwardly displaced away from the VTR deck unit 5 into the automatic cassette loader/unloader, the positioning holes 24 receive respective projections 25 (FIG. 8) mounted on the back sides of the front faces of the arms 100a, 100b, thereby positioning the tray 20.

The cassette holder 10 is in the form of a flat tray-like support. The outwardly spreading guides 12 are mounted on the upper edges of front and side walls thereof for reliably receiving a magnetic tape cassette C which falls into the cassette holder 10. The tapered projection 11 for pushing the magnetic tape cassette C is mounted on the inner surface of the front wall of the cassette holder 10. The cassette holder 10 also has positioning members 13 on opposite sides of an end thereof near the VTR deck unit 5, for engaging the front end or lid of the magnetic tape cassette C to position the magnetic tape cassette C in its transverse direction. Since the magnetic tape cassette C is pushed by the tapered projection 11 after the lid thereof drops on the cassette holder 10, the magnetic tape cassette C does not ride on the positioning members 13.

The cassette holder 10 also has a detecting finger 14 disposed centrally on the end thereof near the VTR deck unit 5, for detecting when the magnetic tape cassette C is placed, with the front end back or upside down, in the cassette holder 10. More specifically, the magnetic tape cassette C has a recess defined in the front end thereof for receiving a tape loading member in the VTR deck unit 5. When the magnetic tape cassette C is properly placed in the cassette holder 10, the detecting finger 14 is inserted in the recess in the front end of the magnetic tape cassette C. However, in the event that the magnetic tape cassette C is improperly placed in the cassette holder 10, the magnetic tape cassette C rides on the detecting finger 14, which prevents the magnetic tape cassette C from being further moved.

The cassette holder 10 is removably supported on the tray 20 by a mechanism shown in FIGS. 12 and 14A.

As shown in FIGS. 12 and 14A, the cassette holder 10 and the tray 20 are operatively coupled to each other by X-shaped links 30. Lock plates 31 are slidably attached to the lower surfaces of the side plates 21 of the tray 20, the lock plates 31 being normally urged toward the VTR deck unit 5 (i.e., to the right in FIG. 14A) under the bias of springs (not shown). The lock plates 31 have projections 32 projecting toward the VTR deck unit 5. The cassette holder 10 has fingers 15 projecting outwardly from its lateral sides and placed on the respective lock plates 31 for preventing the cassette holder 10 from dropping off the tray 20.

The tray 20 is movable back and forth between the VTR deck unit 5 and the automatic cassette loader/unloader 100 by a mechanism shown in FIGS. 11, 12, and 13A through 13D.

Figure 11:
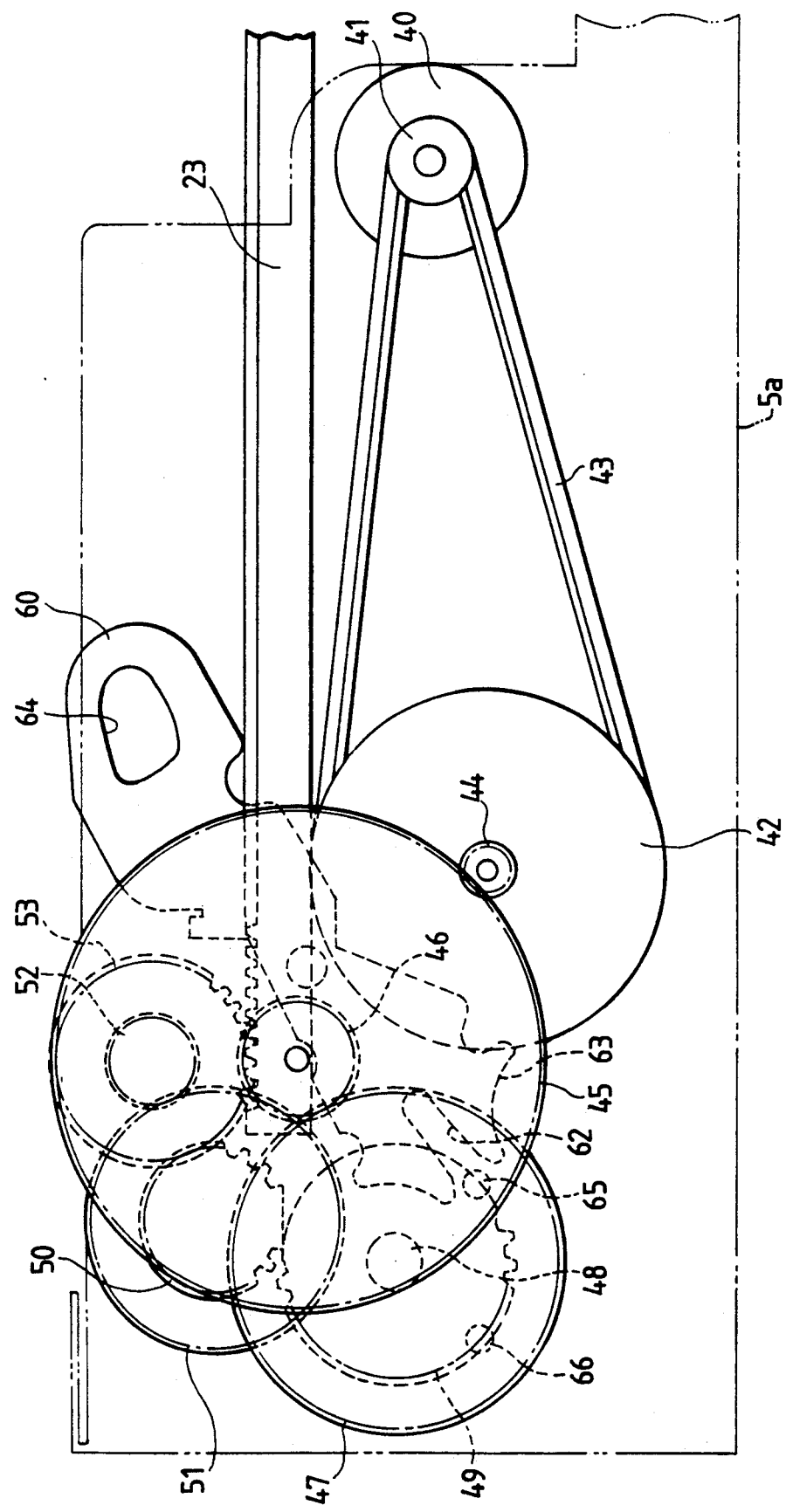
FIG. 11 is a side elevational view of a front portion of the magnetic recorder/reproducer, showing a mechanism for moving the tray back and forth.

As shown in FIGS. 11 and 12, the VTR deck unit 5 has a side wall 5a with a motor 40 fixedly mounted on its outer side. The motor 40 has a pulley 41 mounted on its shaft, and a timing belt 43 is trained under tension around the pulley 41 and a larger-diameter pulley 42 which is rotatably supported on the outer side of the side wall 5a. The larger-diameter pulley 42 is coupled to a smaller-diameter gear 44 coaxial therewith which is held in mesh with a larger-diameter gear 45 that is rotatably mounted on the side all 5a. The larger-diameter gear 45 is coupled to a coaxial smaller-diameter gear 46 which meshes with a gear 47 rotatably supported on the side wall 5a by a shaft 48 that extends laterally through the VTR deck unit 5 (see FIG. 12). The shaft 48 supports, on each of its opposite end portions, a segmental gear 49 which meshes with another segmental gear 50 that is coupled to a coaxial gear 51 meshing with a smaller-diameter gear 52. The smaller-diameter gear 52 is coaxially coupled to a gear 53 which is held in mesh with the rack 23. When the motor 40 is energized, the tray 20, i.e., the cassette holder 10, is moved between the VTR deck unit 5 and the automatic cassette loader/unloader 100 as shown in FIGS. 13A through 13D.

When the magnetic tape cassette C is drawn into the VTR deck unit 5, it is moved together with the cassette holder 10 into the recording/reproducing position in the VTR deck unit 5. A mechanism for moving the magnetic tape cassette C into the recording/reproducing position in the VTR deck unit 5 will be described below with reference to FIGS. 13A through 13D and 14A through 14D. FIGS. 13A through 13D and 14A through 14D show a front portion of the internal structure of the VTR deck unit 5, illustrative of the manner in which the cassette holder 10 moves. For simplicity, however, FIGS. 13A through 13D mainly show a mechanism for moving the cassette holder 10 back and forth and a geneva arm 60, whereas FIGS. 14A through 14D mainly show a catcher 70 for vertically moving the cassette holder 10.

As shown in FIGS. 13A through 13D, the geneva arm 60 is angularly movably supported on the side wall 5a of the VTR deck unit 5 by a shaft 61. The geneva arm 60 has a slot 62 defined in an end thereof, a pair of arcuate guides 63 positioned one on each side of the slot 62, and a hole 64 defined in the opposite end thereof.

The side wall 5a has two vertical slots 71, 72 defined therein and spaced from each other in the longitudinal direction of the side wall 5a. The catcher 70 has two guide pins 73, 74 and an engaging pin 75 disposed on a side wall thereof, the guide pin 73 being movably inserted in the slot 71 and the guide pin 74 and the engaging pin 75 being movably inserted in the slot 72. The engaging pin 75 is also disposed in the hole 64 in the geneva arm 60. Therefore, the catcher 70 is held by the geneva arm 60 through the engaging pin 75. The catcher 70 is of a flat tubular form for receiving the cassette holder 10 together with the magnetic tape cassette C. The catcher 70 has a presser 76 on its upper panel for pressing down the upper surface of the magnetic tape cassette C.

The gear 47 mounted on the shaft 48 has pins 65, 66 projecting from its inner surface.

Figure 13C:
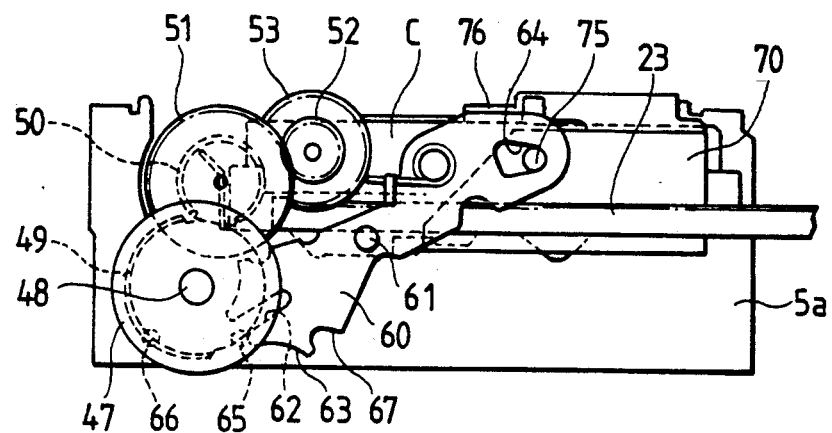
Figure 13D:
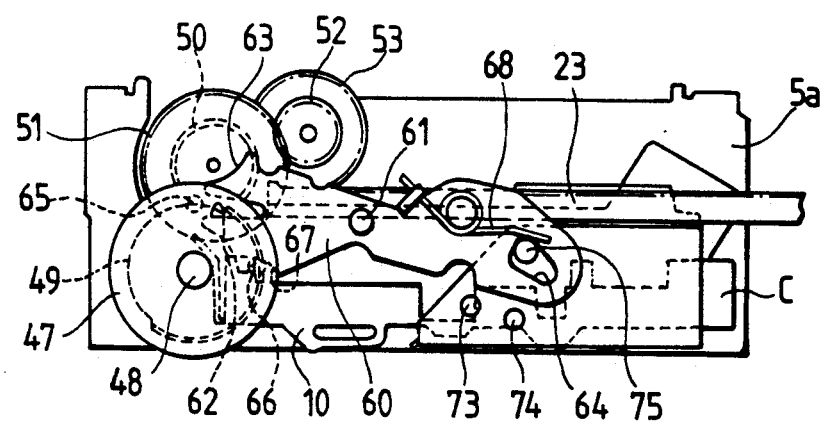

The mechanism for moving the magnetic tape cassette C into the recording/reproducing position in the VTR deck unit 5 operates as follows: When the gear 47 rotates, the gears 49, 50, 51, 52, 53 are rotated to cause the racks 23 to move the tray 20 from the position shown in FIG. 13A through the position shown in FIG. 13B into the VTR deck unit 5 as shown in FIG. 13C In the position shown in FIG 13C, the cassette holder 10 and the magnetic tape cassette C held therein are placed in the catcher 70. Up to this time, the geneva arm 60 has not been turned yet. Further rotation of the gear 47 inserts the pin 65 thereon into the slot 62 of the geneva arm 60, and also causes the pin 65 to turn the geneva arm 60 clockwise about the shaft 61 until finally the pin 66 on the gear 47 engages in and pushes upwardly a recess 67 which is defined in the geneva arm 60 adjacent to the lower arcuate guide 63, as shown in FIG. 13D. At this time, the engaging pin 75 is pressed downwardly by a spring 68 mounted on the geneva arm 60, so that the magnetic tape cassette C is held against the cassette holder 10 under the bias of the spring 68 through the catcher 70. In this manner, the magnetic tape cassette C is prevented from vibrating or wobbling while data are being recorded on or reproduced from the magnetic tape cassette C.

The tray 20 does not move further from the position shown in FIG. 13C into the VTR deck unit 5 upon continued rotation of the gear 47 because the segmental gear 49 coaxial with the gear 47 does not transmit rotation to the segmental gear 50 when the segmental gear 49 rotates from the position shown in FIG. 13C.

Figure 14C:
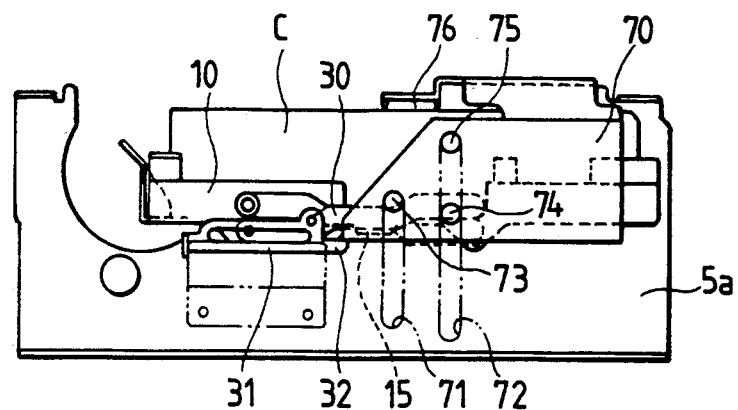

As shown in FIG. 14A, the cassette holder 10 is supported on the tray 20 by the lock plates 31 before the cassette holder 10 is fully inserted into the VTR deck unit 5. When the tray 20 is drawn into the VTR deck unit 5 as described above, the lock plates 31 engage portions of the side plates 5a of the VTR deck unit 5 and are displaced forwardly (i.e., to the left in FIG. 14C) relatively to the cassette holder 10 against the forces of the springs. With the lock plates 31 thus displaced, the fingers 15 of the cassette holder 10 disengage from the lock plates 31, releasing the cassette holder 10 from the tray 20. Since the cassette holder 10 is positioned in the catcher 70 at this time, the cassette holder 10 does not drop from the tray 20.

Figure 14D:
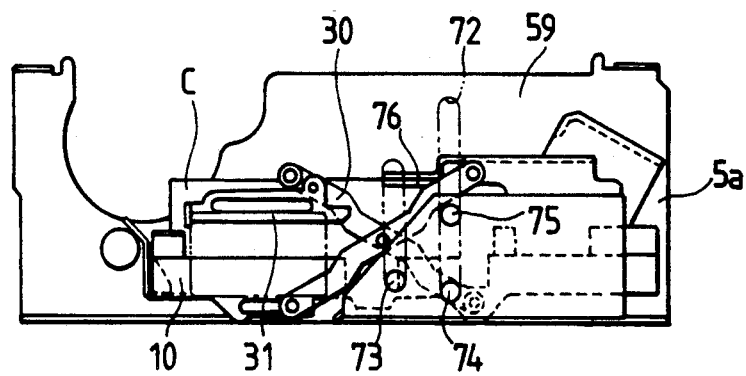

Thereafter, the geneva arm 60 turns clockwise as described above. Inasmuch as the engaging pin 75 of the catcher 70 engages in the hole 64 of the geneva arm 60, the catcher 70 is lowered in response to the turning movement of the geneva arm 60, and so is the cassette holder 10 housed in the catcher 70, as shown in FIG. 14D. The magnetic tape cassette C in the cassette holder 10 now reaches the recording/reproducing position in the VTR deck unit 5. When the magnetic tape cassette C is thus lowered, the lid thereof is opened as shown in FIG. 14D.

In the recording/reproducing position, desired data are recorded on or reproduced from the magnetic tape as it is pulled out of the magnetic tape cassette C and run in sliding contact with magnetic heads in the VTR deck unit 5. After the recording or reproducing process, the magnetic tape cassette C is automatically discharged from the VTR deck unit 5 into the automatic cassette loader/unloader 100 in a discharge process which is the reversal of the above process of inserting the magnetic tape cassette C from the automatic cassette loader/unloader 100 into the VTR deck unit 5.

A cassette discharge mechanism in the automatic cassette loader/unloader 100 will be described below with reference to FIGS. 15 through 17.

Figure 15:
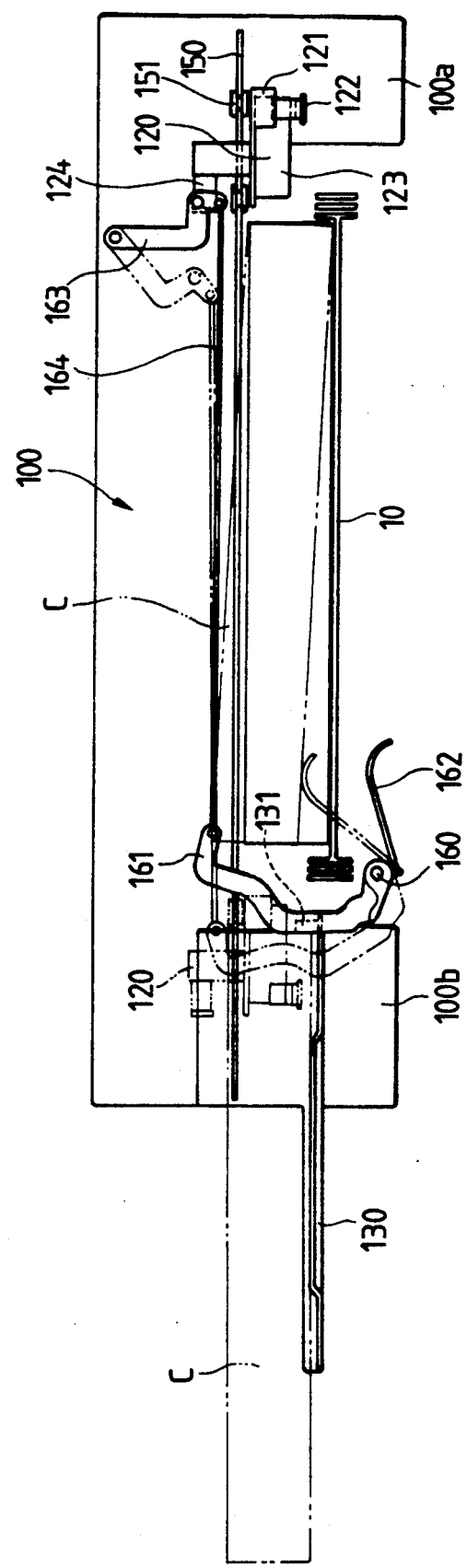
FIG. 15 is a front elevational view of a cassette discharge mechanism in the automatic cassette loader/unloader.
Figure 16:
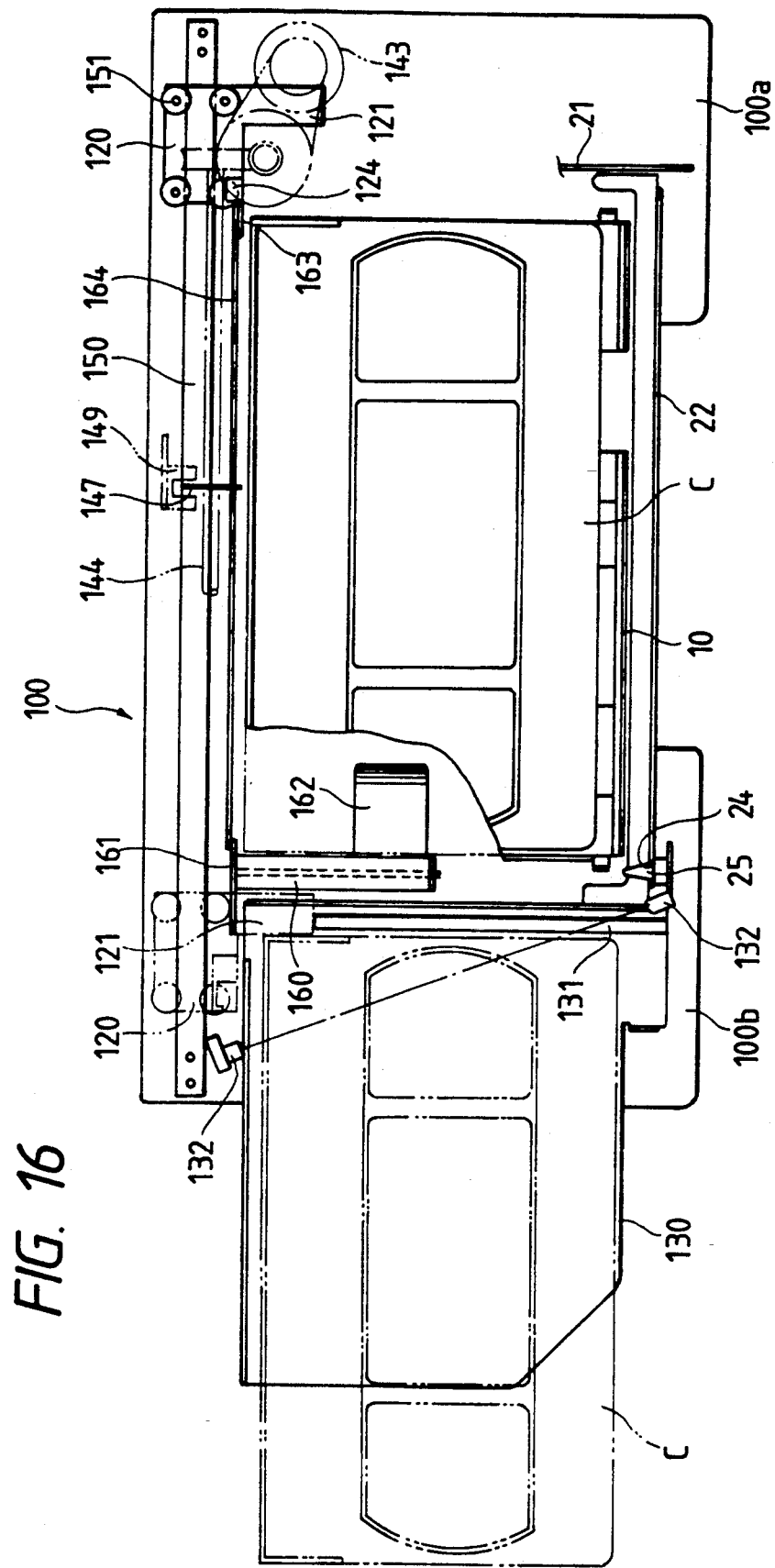
FIG. 16 is a plan view of the cassette discharge mechanism.

As shown in FIGS. 15 and 16, the automatic cassette loader/unloader 100 has a rail 150 disposed therein and extending longitudinally thereof. The pusher 120 is movably supported on the rail 150 by means of a plurality of rollers 151. The pusher 120 is connected to a timing belt (not shown) extending parallel to the rail 150 and operatively coupled to the motor 143. Therefore, when the motor 143 is energized, the pusher 120 is moved back and forth on and along the rail 150 by the timing belt. The pusher 120 has a lever 121 projecting transversely with respect to the rail 150 for engaging one side of the magnetic tape cassette C, a detectable member 123 which is mounted on a lower surface of the pusher 120 and can be detected by a sensor 122 (FIG. 15) disposed in the arm 100a, and an arm 124 mounted on an upper surface of the pusher 120.

A shaft 160 is disposed in the arm 100b near its inner side, and a lever 161 is angularly movably supported at its lower end on the shaft 160. A lifter arm 162 has an end joined to the lower end of the lever 161. The upper end of the lever 161 is connected by a wire 164 such as a piano wire or the like to another lever 163 which is pivotally mounted in the arm 100a near its upper inner side. The lifter ar 162 is normally urged upwardly by a spring (not shown).

When the pusher 120 is positioned at the left end of its stroke, i.e., in the standby position, as shown in FIGS. 15 and 16, the lever 163 is pulled to the right by the arm 124 of the pusher 120 against the bias of the spring acting on the lifter arm 162. At this time, the lever 161 and the lifter arm 162 are in the solid-line position in FIG. 15.

Upon detection, by a sensor, of the recorded or reproduced magnetic tape cassette C which has returned with the cassette holder 10 back into the automatic cassette loader/unloader 100, the motor 143 is energized to move the pusher 120 to the left (FIGS. 15 and 16). The lever 163 is released and the lifter arm 162 is moved upwardly as indicated by the imaginary lines in FIG. 15 under the bias of the spring, thereby lifting one side of the magnetic tape cassette C so that the magnetic tape cassette C can be removed from the cassette holder 10. At this time, the lever 121 of the pusher 120 has not engaged the magnetic tape cassette C yet.

Continued leftward movement of the pusher 120 causes the lever 121 to engage and push the magnetic tape cassette C to the left until the pusher 120 discharges the magnetic tape cassette C over the cassette holder 10 onto the discharge tray 130.

Thereafter, the pusher 120 returns to the original position indicated by the solid lines in FIGS. 15 and 16. When the sensor 122 detects the pusher 122 thus returned, the flaps 101a, 101b are angularly moved downwardly, feeding a new magnetic tape cassette C, which has been inserted, together with the cassette holder 10 into the VTR deck unit 5.

Figure 17:
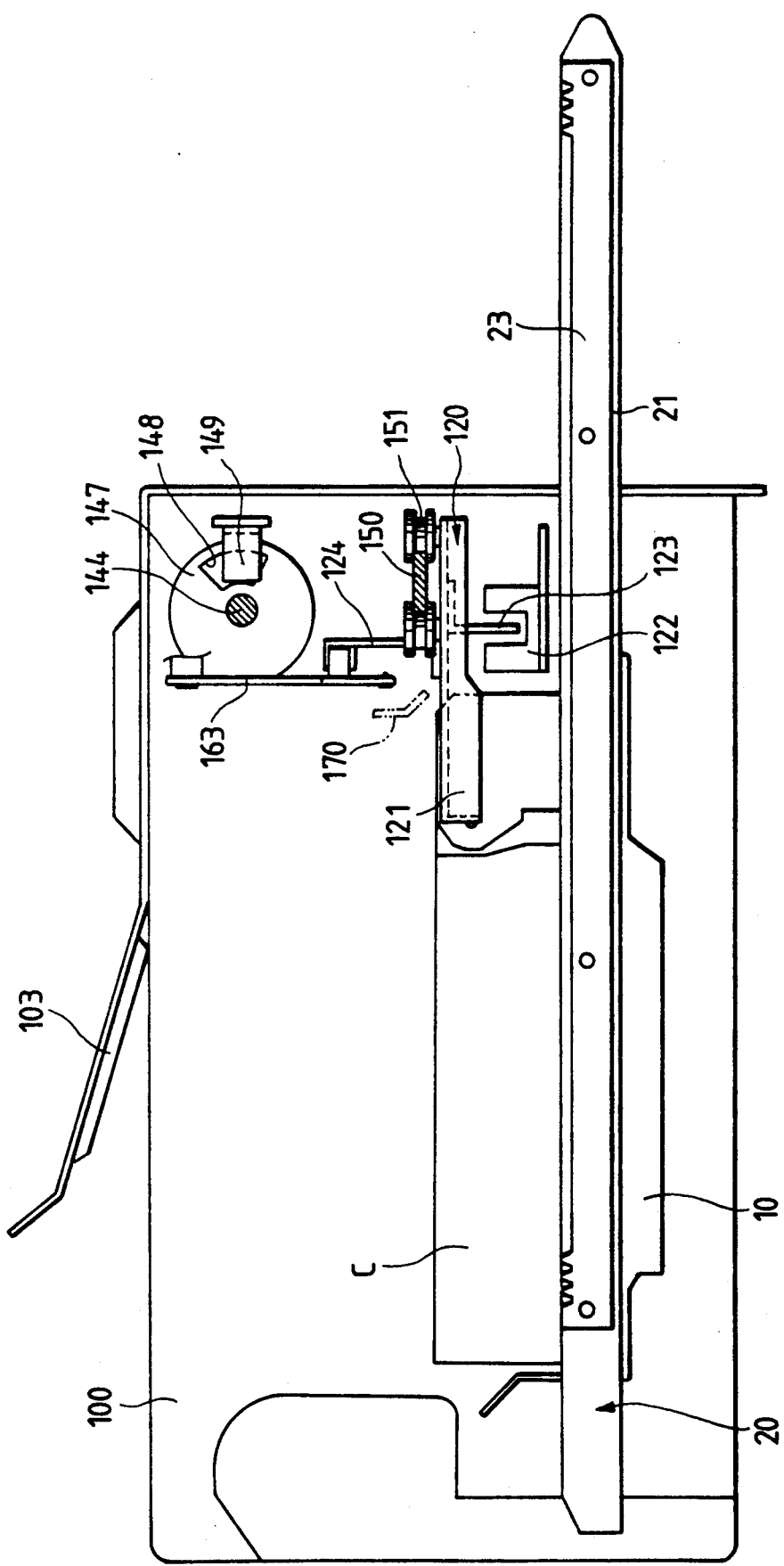
FIG. 17 is a side elevational view of the cassette discharge mechanism.

In order to prevent the magnetic tape cassette C lifted by the lifter arm 162 from physically interfering with other surrounding components and mechanisms, the automatic cassette loader/unloader 100 has a tapered ledge 170 (FIG. 17) positioned immediately above the cassette holder 10, for engaging and pushing the magnetic tape cassette C slightly aside to the left in FIG. 17, i.e., away from the VTR deck unit 5.

As shown in FIGS. 15 and 16, the discharge tray 130 has a bank or ridge 131 on the upper surface of its end disposed in the arm 100b. The bank 131 serves to prevent the magnetic tape cassette C which has been discharged onto the discharge tray 130 from being accidentally pushed back into the automatic cassette loader/unloader 100.

If a next magnetic tape cassette C were discharged onto the discharged tray 130 by the cassette discharge mechanism while there is still a previous magnetic tape cassette C on the discharge tray 130, the previous magnetic tape cassette C would be forced off the discharge tray 130, and might possibly be damaged. To avoid such an accident, the arm 100b houses a sensor 132 for detecting whether there is a magnetic tape cassette C on the discharge tray 130. If the sensor 132 detects a magnetic tape cassette C on the discharge tray 130, then the cassette discharge mechanism is disabled. If the sensor 132 detects no magnetic tape cassette C on the discharge tray 130, then the cassette discharge mechanism is enabled to discharge a magnetic tape cassette C onto the discharge tray 103.

Figure 18:
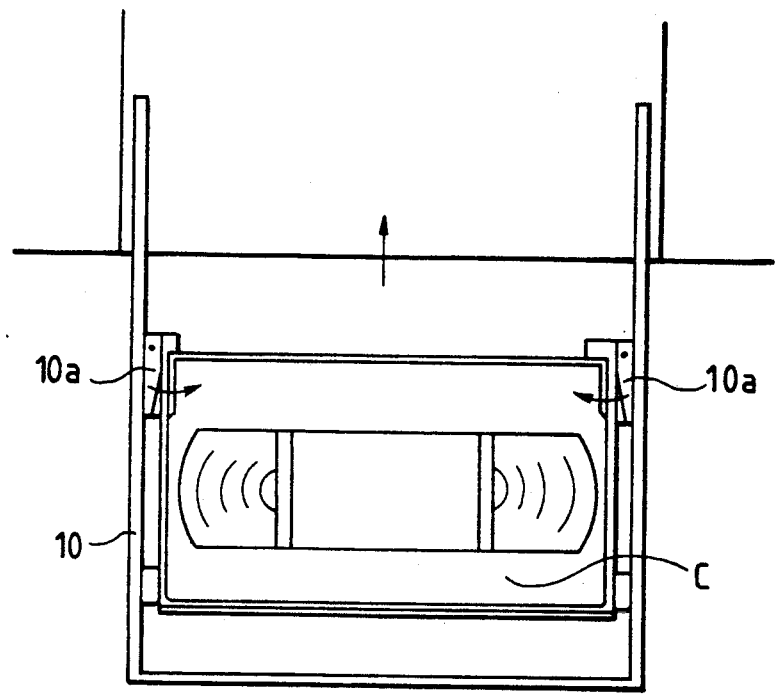
FIGS. 18 and 19 are plan views of different arrangements for positioning the tray and the cassette holder.
Figure 19:
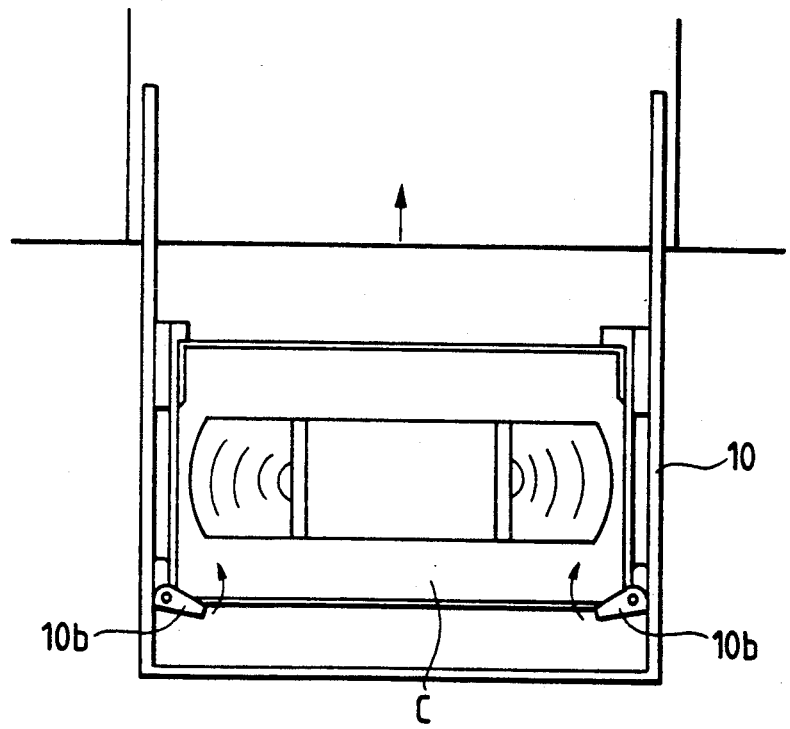

FIGS. 18 and 19 are plan views of different arrangements for positioning the tray and the cassette holder in the automatic cassette loader/unloader.

In FIG. 18, the cassette holder 10 has a slightly wide area or space for holding a magnetic tape cassette C therein, and a pair of pivoted cassette pressers 10a in laterally spaced rear positions therein. When the cassette holder 10 with the magnetic tape cassette C held therein is placed in the automatic cassette loader/unloader, the cassette pressers 10a are positioned outside of the cassette holding area. In response to displacement of the cassette holder 10 from the automatic cassette loader/unloader into the VTR deck unit, the cassette pressers 10a are closed, i.e., angularly moved into the cassette holding area. As the cassette holder 10 is moved into the VTR deck unit, therefore, the cassette pressers 10a are pressed against the sides of the magnetic tape cassette C held by the cassette holder 10. Therefore, the magnetic tape cassette C is reliably positioned in its longitudinal direction by the cassette pressers 10a while the magnetic tape cassette C is being loaded into the VTR deck unit 5.

In FIG. 19, the cassette holder 10 has a slightly wide area or space for holding a magnetic tape cassette C therein, and a pair of pivoted cassette pressers 10b in laterally spaced front positions therein. When the cassette holder 10 with the magnetic tape cassette C held therein is placed in the automatic cassette loader/unloader, the cassette pressers 10a are positioned outside of the cassette holding area. In response to displacement of the cassette holder 10 from the automatic cassette loader/unloader into the VTR deck unit, the cassette pressers 10a are closed, i e., angularly moved into the cassette holding area. As the cassette holder 10 is moved into the VTR deck unit, the cassette pressers 10a push the rear end of the magnetic tape cassette C held by the cassette holder 10. The magnetic tape cassette C is slid toward the VTR deck unit, and fingers (not shown) are brought into abutment against a case of the magnetic tape cassette C through recesses in the opposite ends of the lid of the magnetic tape cassette C. Accordingly, the magnetic tape cassette C is reliably positioned in its transverse direction by the cassette pressers 10b while the magnetic tape cassette C is being loaded into the VTR deck unit 5.

Figure 20:
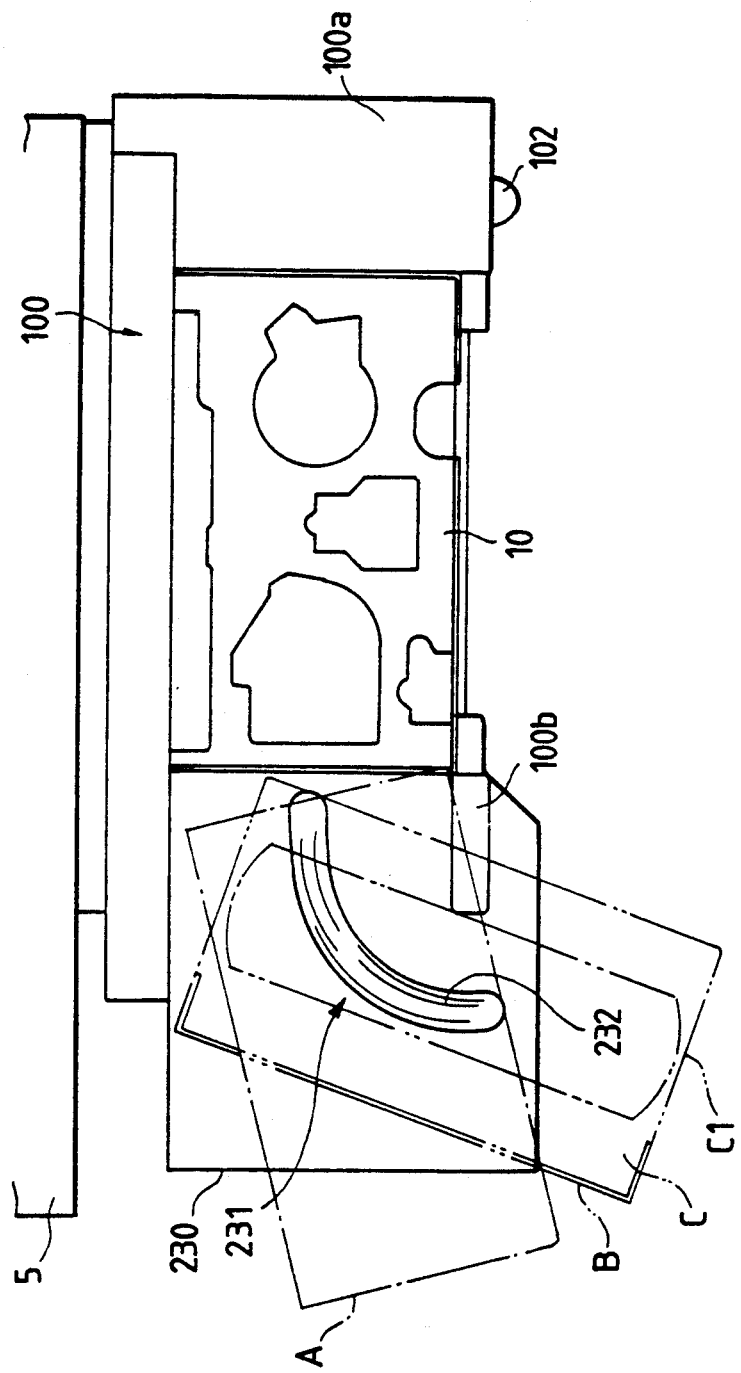
FIG. 20 is a plan view of a discharge tray according to another embodiment of the present invention.

FIG. 20 shows a discharge tray according to another embodiment of the present invention. A discharge tray 230 is associated with a cassette turning mechanism 231 for horizontally turning a discharged magnetic tape cassette C from a position A to a position B. The cassette turning mechanism 231 is preferably in the form of an arcuate guide ridge 232 disposed on the upper surface of the discharge tray 230 and arcuately directed away from the VTR deck unit 5 toward its end remote from the automatic cassette loader/unloader 100. When the magnetic tape cassette C is discharged onto the discharge tray 230, it is pushed at its one corner by the pusher 120 as described above. Therefore, the magnetic tape cassette C is subjected to a counterclockwise moment, as shown in FIG. 20, while it is sliding on the arcuate guide ridge 232, which applies forces tending to turn the magnetic tape cassette C counterclockwise due to the friction therebetween. Due to the combination of the counterclockwise moment and the frictional forces imposed by the arcuate guide ridge 232, the magnetic tape cassette C is turned counterclockwise into the position B in which a leading side C1 thereof faces the operator of the VTR system, i.e., downwardly in FIG. 20. As a result, the operator can easily grip the side C1 of the magnetic tape cassette C to pick up the magnetic tape cassette C.

Figure 21:
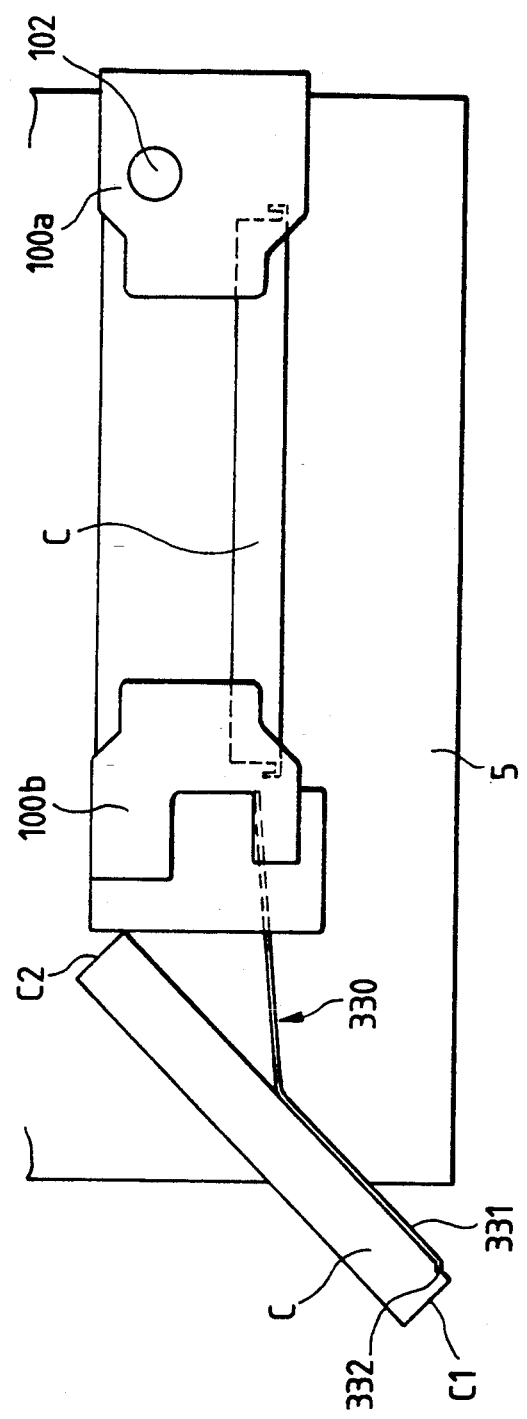
FIG. 21 is a front elevational view of a discharge tray according to still another embodiment of the present invention.

FIG. 21 illustrates a discharge tray according to still another embodiment of the present invention. A discharge tray 330 comprises a chute 331 on its left portion which is inclined at an angle ranging from 30° to 60° with respect to the horizontal plane, and a stop 332 raised at the left end of the chute 331. The chute 331 has a length which is smaller than the longitudinal length, but slightly larger than half the longitudinal length, of the magnetic tape cassette C. When the magnetic tape cassette C is discharged onto the discharge tray 330, its leading side C1 slides down the chute 331 and then is stopped by the stop 332, with a trailing side C2 of the magnetic tape cassette C being lifted off the discharge tray 330. Therefore, the operator can easily grip the lifted trailing side C2 of the magnetic tape cassette C to pick up the magnetic tape cassette C.

Although certain preferred embodiments have been shown and described, it should be understood that many changes and modifications may be made therein without departing from the scope of the appended claims.

What is claimed is:

1. A cassette loader/unloader for loading a tape cassette into and unloading a tape cassette from a magnetic recorder/reproducer through a front panel thereof, the magnetic recorder/reproducer including:

a tray, a cassette holder removably supported on the tray for holding a tape cassette therein;

the cassette holder having at least one guide, and means for moving the tray, with the cassette holder supported thereon, into and out of the magnetic recorder/reproducer through the front panel thereof;

said cassette loader/unloader comprising:

a cassette discharge mechanism adapted to be mounted on the front panel, for removing the tape cassette from the cassette holder which has been moved out of the magnetic recorder/reproducer through the front panel thereof; and a cassette supply mechanism adapted to be mounted on the front panel, for placing a tape cassette into the cassette holder which has been moved out of the magnetic recorder/reproducer through the front panel thereof, said cassette supply mechanism having means for allowing one side of the tape cassette to drop into the cassette holder while said one side is being guided by the guide of the cassette holder in contact therewith, and for subsequently allowing an opposite side of the tape cassette to drop into the cassette holder.

2. A cassette loader/unloader according to claim 1, wherein said cassette supply mechanism comprises a pair of spaced, angularly movable flaps for supporting the respective sides of the tape cassette, and means for angularly moving said flaps successively with a time lag to release the sides of the tape cassette, one after another, into said cassette holder.

3. A cassette loader/unloader according to claim 2, wherein said means for angularly moving said flaps comprises a pair of shafts, said flaps being angularly movably supported on said shafts, respectively, a crank mechanism for angularly moving said flaps successively with said time lag, and a motor for actuating said crank mechanism.

4. A cassette loader/unloader according to claim 1, wherein said cassette discharge mechanism comprises lifter means for lifting one of opposite sides of the tape cassette off said cassette holder, and pusher means for pushing the tape cassette laterally out of said cassette holder parallel to the magnetic recorder/reproducer, with the lifted side of the tape cassette being positioned ahead as a leading side.

5. A cassette loader/unloader according to claim 4, wherein said cassette discharge mechanism comprises a tapered ledge for pushing the tape cassette aside away from the magnetic recorder/reproducer when said one side of the tape cassette is lifted by said lifter means.

6. A cassette loader/unloader according to claim 1, further including first and second engaging means for cooperatively engaging one another to position said cassette holder when the cassette holder is moved out of the magnetic recorder/reproducer, said first engaging means provided in said cassette holder and said second engaging means provided in said cassette loader/unloader.

7. A cassette loader/unloader according to claim 6, wherein said first engaging means comprises a hole defined in said cassette holder, and said second engaging means comprises a projection from said cassette loader/unloader insertable in said hole.

8. A cassette loader/unloader according to claim 1, further includes a pair of spaced arms having front faces with recesses defined in edges thereof for guiding a tape cassette therethrough when the tape cassette is inserted into the cassette loader/unloader, and a guide plate for guiding the tape cassette when the tape cassette is inserted through said recesses.

9. A cassette loader/unloader according to claim 1, wherein said cassette discharge mechanism comprises means for discharging the tape cassette laterally from the cassette holder parallel to the magnetic recorder/reproducer, and a cassette turning mechanism for horizontally turning the tape cassette which is discharged from said cassette holder.

10. A cassette loader/unloader according to claim 9, wherein said cassette discharge mechanism comprises a laterally extending discharge tray for receiving the tape cassette removed from said cassette holder, said cassette turning mechanism including an arcuate ridge disposed on said discharge tray for turning the tape cassette under frictional forces.

11. A cassette loader/unloader according to claim 1, wherein said cassette discharge mechanism comprises means for discharging the tape cassette laterally from the cassette holder parallel to the magnetic recorder/reproducer, and a chute for receiving the tape cassette which is discharged from said cassette holder, said chute being inclined with respect to a horizontal plane and having a length smaller than the length of the tape cassette.

12. A cassette loader/unloader according to claim 1, wherein said cassette supply mechanism comprises a pair of spaced, angularly movable flaps for supporting respective sides of the tape cassette, further including a pair of spaced arms, and a sensor disposed in said arms for detecting a corner of the tape cassette which is supported on said flaps.

13. A cassette loader/unloader according to claim 1, wherein said cassette discharge mechanism comprises a laterally extending discharge tray for receiving the tape cassette removed from said cassette holder, said discharge tray having a bank for preventing the removed tape cassette from returning into said cassette holder.

14. A cassette loader/unloader for loading a tape cassette into and unloading a tape cassette from a magnetic recorder/reproducer, comprising:
 a cassette holder for holding a tape cassette therein;
 means for moving said cassette holder, with the tape cassette held therein, into and out of the magnetic recorder/reproducer;
 a cassette discharge mechanism for removing the tape cassette from said cassette holder which has been moved out of the magnetic recorder/reproducer; and
 a cassette supply mechanism for placing a tape cassette into said cassette holder which is empty and has been moved out of the magnetic recorder/reproducer,
 wherein said cassette discharge mechanism comprises lifter means for lifting one of opposite sides of the tape cassette off said cassette holder, and pusher means for pushing the tape cassette laterally out of said cassette holder parallel to the magnetic recorder/reproducer, with the lifted side of the tape cassette being positioned ahead as a leading side, and
 said lifter means comprises an angularly movable lifter arm which is normally held out of lifting engagement with the tape cassette, and said pusher means comprises a pusher movable for engaging and pushing the tape cassette, said cassette discharge mechanism further comprising joint means for operatively joining said pusher and said lifter arm to each other such that said lifter arm is angularly moved into lifting engagement with the tape cassette when said pusher is moved to engage and push the tape cassette.

15. A cassette loader/unloader according to claim 14, wherein said cassette discharge mechanism further includes a rail, said pusher being movably supported on said rail.

* * * * *